US010558585B2

(12) United States Patent
Nevers et al.

(10) Patent No.: US 10,558,585 B2
(45) Date of Patent: Feb. 11, 2020

(54) DYNAMIC MEMORY SCRAMBLING

(71) Applicant: ARM Limited, Cambridge (GB)

(72) Inventors: Yannick Marc Nevers, Sassenage (FR); Bastien Jean Claude Aghetti, Grenoble (FR); Nicolaas Klarinus Johannes Van Winkelhoff, Grenoble (FR); Stephane Zonza, Cannes (FR)

(73) Assignee: ARM Limited, Cambridge (GB)

( * ) Notice: Subject to any disclaimer, the term of this patent is extended or adjusted under 35 U.S.C. 154(b) by 236 days.

(21) Appl. No.: 15/355,785

(22) Filed: Nov. 18, 2016

(65) Prior Publication Data
US 2017/0147509 A1 May 25, 2017

(30) Foreign Application Priority Data

Nov. 20, 2015 (GB) .................................. 1520512.3

(51) Int. Cl.
*G06F 12/14* (2006.01)
*G06F 21/79* (2013.01)
*G06F 12/1009* (2016.01)
*G06F 21/55* (2013.01)

(52) U.S. Cl.
CPC .......... *G06F 12/14* (2013.01); *G06F 12/1009* (2013.01); *G06F 21/552* (2013.01); *G06F 2212/1052* (2013.01); *G06F 2221/034* (2013.01)

(58) Field of Classification Search
None
See application file for complete search history.

(56) References Cited

U.S. PATENT DOCUMENTS

| 6,532,556 | B1 * | 3/2003 | Wong .................. G06F 12/1408 711/220 |
| 6,572,024 | B1 | 6/2003 | Baldischweiler et al. |
| 2008/0168214 | A1 * | 7/2008 | Kwon ................... G06F 12/023 711/103 |
| 2008/0288785 | A1 * | 11/2008 | Rao ...................... G06F 12/1408 713/190 |
| 2009/0086965 | A1 | 4/2009 | Glendinning |
| 2009/0113217 | A1 | 4/2009 | Dolgunov et al. |

(Continued)

OTHER PUBLICATIONS

UKIPO Examination and Search Report; GB 1520512.3; dated May 3, 2016.

*Primary Examiner* — Fatoumata Traore
(74) *Attorney, Agent, or Firm* — Pramudji Law Group PLLC; Ari Pramudji

(57) ABSTRACT

A memory, a data processing system comprising a memory, a method of operating a memory and a memory compiler apparatus and method of memory compilation are provided, which relate to a memory comprising data storage circuitry to store data values at data locations. Addressing circuitry is provided to access the data value at a storage location in dependence on a received address and readout circuitry to provide an output value in dependence on the accessed data value. The memory further comprises scrambling circuitry to select at least one of: a mapping between the address and the storage location; and a mapping between the data value and the output value, in dependence on a received scrambling value. The mapping between the address and the storage location and/or the data value and the output value can thus be easily and rapidly changed.

20 Claims, 13 Drawing Sheets

(56) References Cited

U.S. PATENT DOCUMENTS

| | | | |
|---|---|---|---|
| 2010/0241874 A1* | 9/2010 | Vergnes | G06F 21/71 |
| | | | 713/193 |
| 2012/0317423 A1* | 12/2012 | Dolgunov | G06F 12/1408 |
| | | | 713/190 |
| 2013/0094320 A1 | 4/2013 | Yoo et al. | |
| 2013/0205139 A1* | 8/2013 | Walrath | G06F 21/72 |
| | | | 713/190 |
| 2013/0262880 A1 | 10/2013 | Pong et al. | |
| 2015/0019878 A1 | 1/2015 | Gammel | |

* cited by examiner

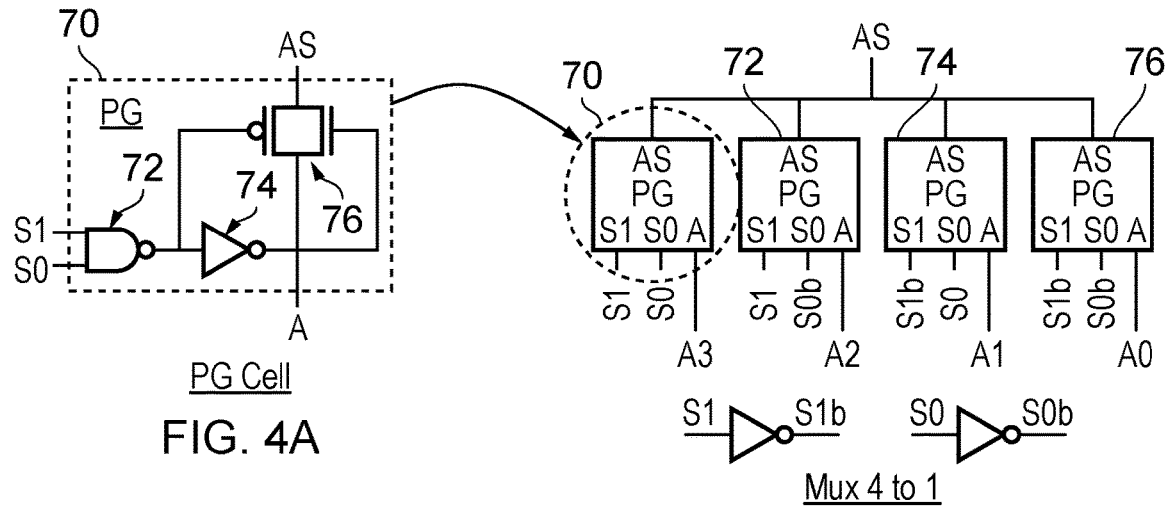
FIG. 4A
FIG. 4B
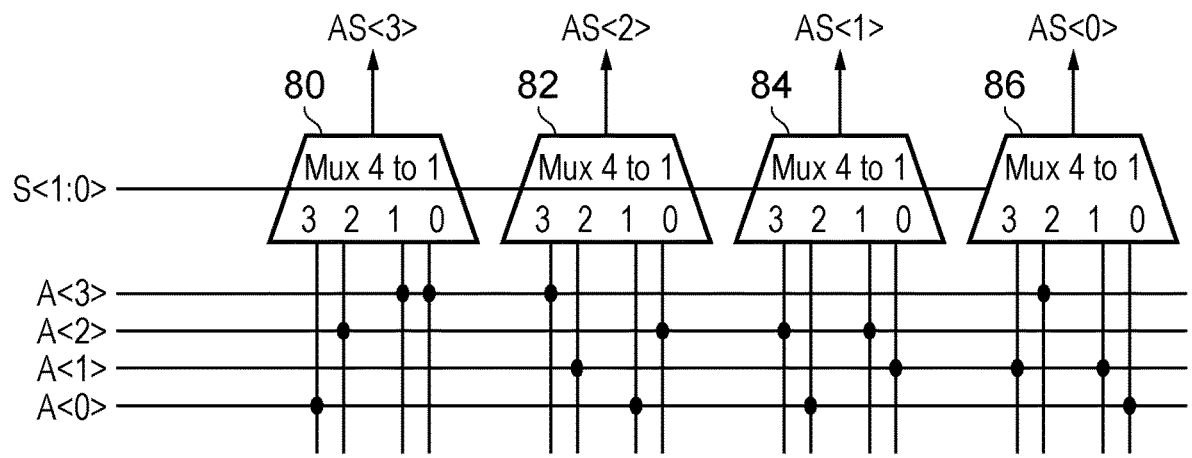
FIG. 4C

| S<1:0> | AS<3> | AS<2> | AS<1> | AS<0> |
|---|---|---|---|---|
| 00 | A<3> | A<2> | A<1> | A<0> |
| 01 | A<3> | A<0> | A<2> | A<1> |
| 10 | A<2> | A<1> | A<0> | A<3> |
| 11 | A<0> | A<3> | A<2> | A<1> |

FIG. 5A

| S<1:0> | AS<3> | AS<2> | AS<1> | AS<0> |
|---|---|---|---|---|
| 00 | A<3> | A<2> | A<1> | A<0> |
| 01 | A<3> | A<0> | A<2> | A<1> |
| 10 | A<2> | A<1> | A<0> | A<3> |
| 11 | A<0> | A<0> | A<1> | A<1> |

FIG. 5B

| S<1:0> | AS<4> | AS<3> | AS<2> | AS<1> | AS<0> |
|---|---|---|---|---|---|
| 00 | – | A<3> | A<2> | A<1> | A<0> |
| 11 | A<3> | – | A<0> | A<2> | A<1> |

FIG. 5C

DYNAMIC MEMORY SCRAMBLING

CROSS-REFERENCE TO RELATED APPLICATIONS

This application claims priority to United Kingdom Patent Application No. GB 1520512.3, filed 2015 Nov. 20, and titled DYNAMIC MEMORY SCRAMBLING, the entire disclosure of which is herein incorporated by reference.

TECHNICAL FIELD

The present disclosure relates to the field of data processing. More particularly it relates to memories used in data processing.

BACKGROUND

The storage of data in a memory within a data processing system, whilst necessary for the data processing to be carried out, can have characteristics which render it vulnerable to exposure or hacking, which is clearly undesirable for the intended user of the data processing system. For example, where a memory is provided in a system-on-chip, the content of this memory (in the case of this being a RAM) are typically loaded at the system initialisation stage. This can result in much, if not all, of the data loaded into that memory being physically located at the same places inside the memory each time this system is initialised, potentially making it easier for a hacker to examine, read, and possibly modify the content of the memory. Once a hacker is able to interfere with the memory content in this manner, this can lead to security vulnerabilities with regard to, for example, encryption keys, secure data and so on. As just one specific example, the bit content of a particular memory location may be modified (set/unset) in order to then observe the effect that this has on the data outputs of the memory.

Various techniques are may be used to seek to address such security vulnerabilities, such as duplicating the content of one memory instance into an essentially identical memory instance and then comparing the output data from each to ensure that no bits have been corrupted or hacked. Another approach is to define a portion of each data value stored in the memory as a "key", without the knowledge of which portion this is being made publicly available, such that this key can be compared to a predetermined reference key and it can therefore be identified when bits have been modified within this portion of a data value. Nevertheless the opportunity remains for improvements to be made in the manner in which such a memory device is protected in such situations.

SUMMARY

At least some embodiments of the present techniques provide a memory comprising: an address input to receive an address; data storage circuitry to store a plurality of data values at a plurality of storage locations; addressing circuitry to access a data value of the plurality of data values at a storage location of the plurality of storage locations in dependence on the address; a scrambling input to receive a scrambling value; readout circuitry to provide an output value from the memory in dependence on the data value read from the storage location; and scrambling circuitry to select at least one of: a mapping between the address and the storage location; and a mapping between the data value and the output value, in dependence on the scrambling value At least some embodiments of the present techniques provide a data processing system comprising: a processor to perform data processing operations; and at least one memory according to the embodiments described above.

At least some embodiments of the present techniques provide a method of operating a memory comprising: storing a plurality of data values at a plurality of storage locations; receiving an address; receiving a scrambling value; selecting at least one of: a mapping between the address and a storage location of the plurality of storage locations; and a mapping between a data value and an output value, in dependence on the scrambling value; and accessing the data value of the plurality of data values at a storage location of the plurality of storage locations in dependence on the address; and providing the output value at an output of the memory in dependence on the data value read from the storage location.

At least some embodiments of the present techniques provide a memory comprising: means for storing a plurality of data values at a plurality of storage locations; means for receiving an address; means for receiving a scrambling value; means for selecting at least one of: a mapping between the address and a storage location of the plurality of storage locations; and a mapping between a data value and an output value, in dependence on the scrambling value; and means for accessing the data value of the plurality of data values at a storage location of the plurality of storage locations in dependence on the address; and means for providing the output value at an output of the memory in dependence on the data value read from the storage location.

At least some embodiments of the present techniques provide a method of operating a data processing system comprising at least one memory according to the first aspect, the method comprising: transmitting an address to the address input; and one of the steps of: transmitting the scrambling value to the scrambling input; and transmitting the scrambling control signal to the scrambling control input.

At least some embodiments of the present techniques provide a data processing system comprising: at least one memory according to the first aspect; means for transmitting an address to the address input; and one of: means for transmitting the scrambling value to the scrambling input; and means for transmitting the scrambling control signal to the scrambling control input.

At least some embodiments of the present techniques provide a method of memory compilation comprising: executing a memory compiler computer program to control a computer to generate an instance of a memory device from a memory architecture associated with the memory compiler computer program, wherein the memory architecture specifies a definition of circuit elements and data defining rules for combining those circuit elements, and wherein the instance generated specifies a memory device according the first aspect.

At least some embodiments of the present techniques provide a memory compiler apparatus comprising: memory architecture storage to store a memory architecture specifying a definition of circuit elements and data defining rules for combining those circuit elements; and memory instance generation circuitry to generate an instance of a memory device from the memory architecture, wherein the instance generated specifies a memory device according to the first aspect.

At least some embodiments of the present techniques provide a memory compiler apparatus comprising: means for executing a memory compiler computer program to control a computer to generate an instance of a memory device from a memory architecture associated with the memory compiler computer program, wherein the memory architecture specifies a definition of circuit elements and data defining rules for combining those circuit elements, and wherein the instance generated specifies a memory device according to the first aspect.

At least some embodiments of the present techniques provide a computer program storage medium storing in a non-transient fashion a memory compiler computer program for controlling a computer to generate an instance of a memory device from a memory architecture associated with the memory compiler computer program, the memory architecture specifying a definition of circuit elements and data defining rules for combining those circuit elements, wherein the instance generated specifies a memory device according to the first aspect.

BRIEF DESCRIPTION OF THE DRAWINGS

The present techniques will be described further, by way of example only, with reference to embodiments thereof as illustrated in the accompanying drawings, in which:

FIGS. 4A, 4B and 4C schematically illustrate an embodiment of the scrambling circuitry of FIG. 3;

FIGS. 5A, 5B and 5C show example mappings from input address bits to scrambled address bits in dependence on a scrambling value in three respective embodiments;

DESCRIPTION OF EMBODIMENTS

Figure 1:
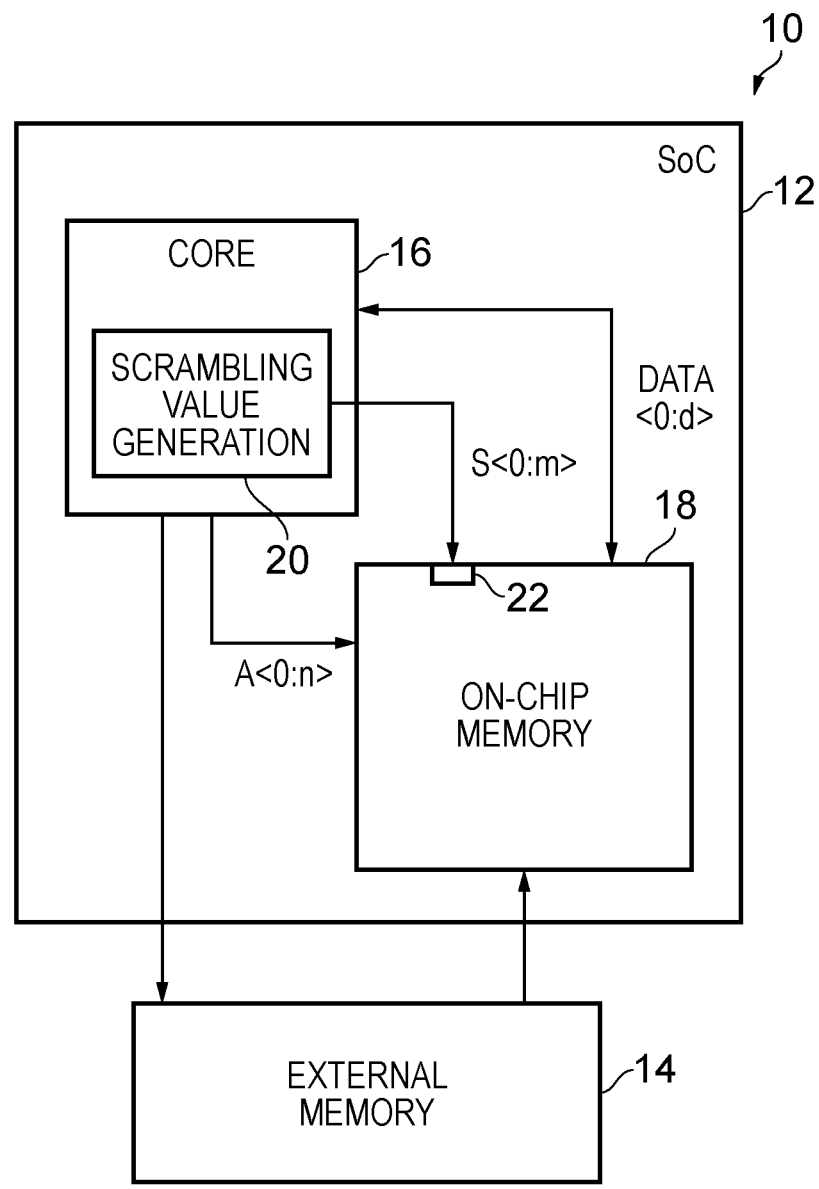
FIG. 1 schematically illustrates a data processing system in one embodiment.

At least some embodiments provide a memory comprising: an address input to receive an address; data storage circuitry to store a plurality of data values at a plurality of storage locations; addressing circuitry to access a data value of the plurality of data values at a storage location of the plurality of storage locations in dependence on the address; a scrambling input to receive a scrambling value; readout circuitry to provide an output value from the memory in dependence on the data value read from the storage location; and scrambling circuitry to select at least one of: a mapping between the address and the storage location; and a mapping between the data value and the output value, in dependence on the scrambling value.

The present techniques recognise that improved security of the content of a memory is supported by providing scrambling circuitry in the memory which maps one or both of: a received address to a given storage location; and an accessed data value and an output value, in dependence on a scrambling value received. Accordingly, by virtue of this scrambling value being able to be changed, dynamic scrambling of the received address and/or the output value is supported and therefore the content of the memory is better protected. With regard to the address information, a given address input into the memory (in order to access (whether read or write) the data value specified by that address) can be caused to access a different physical location within the memory in dependence on the scrambling value currently being used. With regard to the data value output from the memory, this output value can be caused to change in dependence on the scrambling value currently being used. Furthermore, since the scrambling value can be quickly changed (e.g. within a cycle) the content of the memory can thus be protected within that same short period of time, and indeed this can be seen as a mechanism to quickly corrupt the output of the memory simply by changing the scrambling value. This is faster than prior art techniques of protecting content of the memory by performing an erase of the content, which will typically take several cycles to perform and consume significantly more power. Furthermore, the present techniques have an area advantage in terms of implementation with respect to the above-mentioned prior art techniques of memory duplication or key comparison, due to avoidance of the comparators which must be provided to support such prior art techniques.

The manner in which the addressing circuitry and the scrambling circuitry implement the translation between a received address and an access to a particular storage location within the memory may take a variety of forms, but in some embodiments the scrambling circuitry is responsive to the scrambling value to generate a scrambled address in dependence on the mapping selected, wherein for at least one mapping at least two bits of the scrambled address are swapped with respect to at least two corresponding bits of the address. Thus, known techniques for translating (e.g. demultiplexing) an address into control signals for accessing storage locations (e.g. bit cells arranged in lines and columns) of the memory can still be used, by virtue of translating the received address into a scrambled address using the selected mapping. However in addition, where at least one mapping results in at least two bits of the scrambled address being swapped with respect to two corresponding bits of the received address, this supports the ability rapidly to switch between a "regular" usage of the address within the memory, and one in which at least two bits are swapped. The swapping of these two bits may be implemented in a number of different ways in order to change the usage of physical locations within the memory, from the finest level of granularity of switching the usage of two bit cells, through switching the usage of, say, rows or columns, through using a different bank within a memory, through to using an entirely different memory instance, where the relevant bits of the address are used to select between those memories.

In some embodiments the scrambling circuitry is responsive to a first value of the scrambling value to select a first mapping, wherein the first mapping provides a one-to-one mapping between bits of the address and bits of the scrambled address. This enables the memory to make translations between the received address and the scrambled address which (assuming that other addressing rules are respected) enable a valid scrambled address to be generated from the received address.

In some embodiments the scrambling circuitry is responsive to a second value of the scrambling value to select a second mapping, wherein the scrambled address generated according to the second mapping is invalid according to an addressing protocol of the memory. Thus, when the second mapping is selected, the resulting scrambled address does not adhere to a defined addressing protocol for the memory and therefore cannot result in valid data being output from the memory. This therefore represents one mechanism by which the content of the memory can be protected when the scrambling value is switched to select the second mapping.

The particular manner in which an invalid scrambled address is generated may take a variety of forms, but in some embodiments the second mapping provides a non-one-to-one mapping between bits of the address and bits of the scrambled address. For example, a bit of the input address may simply be dropped and a scrambled address may then be generated which comprises less information than in the received address, i.e. is generated without using that dropped bit, but another bit of the input address is perhaps repeated. Alternatively, the scrambled address may be generated having a value which, whilst logically possible for the memory, is not defined for a storage location in the memory and thus the scrambled address is of a non-existent storage location in the memory. Thus, once the scrambling value has been switched to the second value, by seeking to access a non-existent storage location in the memory, the data output from the memory will be meaningless.

The scrambling circuitry which provides the mapping between a received address and the scrambled address may take a variety of forms, but in some embodiments the scrambling circuitry comprises: a coupling from a bit of the address to at least two candidate bit paths; and selection circuitry responsive to the scrambling value to select one of the candidate bit paths to provide a corresponding bit of the scrambled address. For example, the selection circuitry may take the form of a multiplexer which selects between the candidate bit paths in order to provide the bit of the scrambled address. It is an implementation choice for the system designer to decide on the input width of such selection circuitry, which may only provide two inputs to the selection circuitry, between which the scrambling value causes a selection to be made to provide the corresponding bit of the scrambled address, through to selection circuitry for this bit of the scrambled address which can select from any bit of the received address, provided that the relevant couplings between each bit of the received address and a corresponding number of candidate bit paths is made and the selection circuitry has a suitable width to select between any of those candidate bit paths.

Accordingly, in some embodiments the scrambling circuitry comprises: scrambled address selection circuitry for each bit of the scrambled address; and at least one coupling from each bit of the address to at least one scrambled address selection circuitry.

As mentioned above, the manner in which the memory uses the received address to select a particular storage location within the memory may take a variety of forms, but in some embodiments the addressing circuitry comprises address interpretation circuitry to generate memory-specific control signals to access the storage location in dependence on the address, wherein the memory-specific control signals comprise at least one of: a bank address; a line address; a word-line address; and a column address, which is dependent on the mapping selected by the scrambling circuitry. Accordingly, the mapping selected by the scrambling circuitry can cause at least one of these groups of control signals to be scrambled in dependence on the scrambling value and thus a variation in the physical location selected for a given received address can be implemented at the level of one or more of a bank, a line, a word line, or a column, or at any level of finer granularity within any of these groups.

In some embodiments the scrambling performed in dependence on the scrambling value is not only performed with respect to the address received but also with respect to the data to be stored. Thus in some embodiments the scrambling circuitry is responsive to the scrambling value to generate a scrambled set of data value for storage. Hence both the address and the stored data may be scrambled, further hiding the content of the memory.

In some embodiments the scrambling performed in dependence on the scrambling value is not only performed with respect to the address received but also with a respect to the data value being read out from the storage location and in some such embodiments the readout circuitry comprises readout scrambling circuitry to select a readout mapping between the data value read from the storage location and the output value in dependence on the scrambling value. This provides a further level of protection for the content of the memory by enabling changes to be made to the data retrieved from a given set of storage locations, such that even if the hacker is able to modify the content of a particular physical storage location, variation in the scrambling value will cause variation in the data output, which further adds difficulty to understanding what data is stored where within the memory.

The generation of the scrambling value may take place within the memory itself, or may take place externally to the memory. Accordingly, in some embodiments the scrambling input is on a periphery of the memory to receive the scrambling value from a source external to the memory. Thus, for example, where this scrambling value is generated by a processor which seeks access to the memory, as well as providing the memory address to which access is sought, the processor can then also provide the scrambling value. Alternatively, when the scrambling value is generated within the memory, the scrambling value generation circuitry can comprise randomization circuitry to generate a randomly selected scrambling value. When this is the case, the scrambling value generation circuitry may comprise randomisation circuitry to generate a randomly selected scrambling value. This may be provided according to any known technique for random number generation selection, e.g. based on random atomic or subatomic physical phenomenon such as thermal noise (if sufficient area is available). Note that the random source may in fact be pseudo-random, instead of truly random.

Further, in embodiments in which the scrambling value is generated within the memory device, the memory may be provided with a scrambling control input on a periphery of the memory to receive a scrambling control signal from a source external to the memory, wherein the scrambling value generation circuitry is responsive to a change in the scrambling control signal to change the scrambling value. Thus, in such embodiments, control over the changing of the scrambling value may be asserted by the external source, e.g. a processor seeking access to the memory, and the scrambling control signal enables that external source to signal to the memory when the scrambling value should be changed.

At least some embodiments provide a data processing system comprising: a processor to perform data processing operations; and at least one memory according to any of the above-described embodiments.

In some embodiments the processor comprises scrambling value generation circuitry to generate the scrambling value. This scrambling value is then transmitted, for example on a "scrambling bus" provided for this purpose, to the memory to be received at its scrambling input.

In some embodiments the processor comprises scrambling control signal generation circuitry to generate the scrambling control signal. Such an embodiment will typically be provided as an alternative to the above-mentioned embodiment in which the processor comprises scrambling value generation circuitry. In other words the processor will typically be arranged to either provide the memory with the scrambling value, or to provide the memory with a scrambling control signal which determines when the memory generates a new scrambling value internally, although embodiments in which scrambling value generation is possible within either the processor and the memory are also envisaged.

Wherever the scrambling value generation circuitry is provided within the data processing circuitry (i.e. within the processor, within the memory, or within both), in some embodiments the scrambling value generation circuitry is responsive to a trigger event to change the scrambling value. Thus, the data processing system can be responsive to one or more trigger events which will cause it to change the scrambling value and therefore take a protection step with regard to the content of the memory.

The one or more trigger events may take a variety of forms, but in some embodiments the trigger event comprises at least one of: a power-up of the data processing system; a power-down of the data processing system; reception of an attack indication; and completion of a write procedure to the memory. Thus for example, where the trigger event is a power-up of the data processing system, this arrangement provides that each time the data processing system is initialised, a new scrambling value is generated (e.g. randomly), such that content of the memory which is loaded as part of an initialisation process at power-up will be stored at different physical locations on each power-up. Alternatively, or in addition, this variation of the scrambling value may take place when at least part of the data processing system powers down, in particular if the data processing system comprises a non-volatile memory in which some content of the memory device remains even after at least partial power-down of the data processing system. During normal powered usage of the data processing system the trigger event may be reception of an attack indication, which may take a variety of forms, and inform that hacking may be in progress and the data processing system can thus take an immediate and rapid (as mentioned above for example in merely one cycle) action to protect the content of the memory. The attack indication may come from a hardware or a software source. The change in scrambling value may also be triggered by the completion of a write procedure to the memory, such that as soon as a "full write" has been completed, the content thus written can be protected by switching the scrambling value, in the knowledge that this content can be reliably accessed again by the processor by means of returning the scrambling value to the value it had when the write procedure was carried out.

The manner in which the attack indication is provided may take a variety of forms, but in some embodiments the data processing system comprises attack sensing circuitry to provide the attack indication, wherein the attack sensing circuitry comprises at least one of: power cycling detection circuitry; voltage range detection circuitry; and temperature range detection circuitry. Thus, the data processing system can for example detect when an unusual frequency of power cycling takes place, as may for example be attempted by a hacker seeking to repeatedly reboot the system in order to implement one variety of attack. Alternatively, or in addition, the attack indication may be generated by voltage range detection circuitry to defend against attacks involving subjecting the data processing system to an unusual voltage (whether high or low) in order to seek to implement an attack. The attack indication may also be provided by temperature range detection circuitry which monitors the current temperature of the data processing system, thus also defending against hacks based on subjecting the data processing system to an unusually high or low temperature.

As well as initially changing the scrambling value in response to the trigger event, in some embodiments the processor is responsive to the trigger event to maintain the changed scrambling value until the data processing system is rebooted. Thus, in effect the data processing system enters a variety of memory access lockdown which, having changed the scrambling value to "corrupt" the content of the memory device, is maintained until the data processing system is rebooted.

The scrambling value generation circuitry may comprise randomisation circuitry to generate a randomly selected scrambling value, this scrambling value generation circuitry being provided in either the processor or the memory.

In some embodiments the memory is a read-only-memory (ROM) and the scrambling value generation circuitry is arranged to generate the scrambling value prior to the trigger event with a predetermined value. Due to the fact that the content of such a ROM is fixed, a predetermined value of the scrambling value is required for the data processing system to be able to retrieve non-corrupted data from the memory, but the present techniques can nevertheless be used in the event of the trigger event rapidly to change the scrambling value and thus protect content of a ROM as well.

In some embodiments, the data processing system comprises a first memory and a second memory, and memory selection circuitry to select between the first memory and the second memory to select the storage location in dependence on the scrambling value. Thus not only can a physical storage location within a given memory be varied according to the present techniques in dependence on the scrambling value, but also which of two or more separate memory instances are used in dependence on the scrambling value. It may be the case that the first memory is used by the data processing system for a first variety of data, whilst the second memory is used for a second variety of data. For example these two types of data may be instructions and associated data respectively which are loaded at system initialisation, and the change in scrambling value thus enables this usage to be switched between the two.

The provision of (at least) two memories may be done as part of a security technique of duplicating data between two memories in order to be able to compare the output of each to determine if data within one has been tampered with. In such embodiments the data processing system may comprise duplication circuitry to duplicate content of the first memory in the second memory, and wherein the scrambling value generation circuitry is arranged to generate a first scrambling value for the first memory and a second scrambling value for the second memory, wherein the first scrambling value is not equal to the second scrambling value. Accordingly, even though duplicate data is stored in the two memories, the physical locations used within each memory instance can differ thus further making an understanding of where particular data is stored within the two memories, and its meaning in each, more difficult for a hacker.

At least some embodiments provide a method of operating a memory comprising: storing a plurality of data values at a plurality of storage locations; receiving an address; receiving a scrambling value; selecting at least one of: a mapping between the address and a storage location of the plurality of storage locations; and a mapping between a data value and an output value, in dependence on the scrambling value; and accessing the data value of the plurality of data values at a storage location of the plurality of storage locations in dependence on the address; and providing the output value at an output of the memory in dependence on the data value read from the storage location.

At least some embodiments provide a memory comprising: means for storing a plurality of data values at a plurality of storage locations; means for receiving an address; means for receiving a scrambling value; means for selecting at least one of: a mapping between the address and a storage location of the plurality of storage locations; and a mapping between a data value and an output value, in dependence on the scrambling value; and means for accessing the data value of the plurality of data values at a storage location of the plurality of storage locations in dependence on the address; and means for providing the output value at an output of the memory in dependence on the data value read from the storage location.

At least some embodiments provide a method of operating a data processing system, comprising at least one memory according to one of the embodiments described above, the method comprising: transmitting an address to the address input; and one of the steps of: transmitting the scrambling value to the scrambling input; and transmitting the scrambling control signal to the scrambling control input.

At least some embodiments provide a data processing system comprising at least one memory according to any of the above described embodiments; means for transmitting an address to the address input; and one of: means for transmitting the scrambling value to the scrambling input; and means for transmitting the scrambling control signal to the scrambling control input.

At least some embodiments provide a method of memory compilation comprising: executing a memory compiler computer program to control a computer to generate an instance of a memory device from a memory architecture associated with the memory compiler computer program, wherein the memory architecture specifies a definition of circuit elements and data defining rules for combining those circuit elements, and wherein the instance generated specifies a memory device according to any of the above described embodiments. Thus, the present techniques may also be applied at the stage of generating a particular instance of a memory via the technique of memory compilation.

When performing such memory compilation, and when the memory device being compiled comprises scrambling circuitry which implements the above-described coupling between bits of the received address and at least two candidate bit paths to provide selection circuitry which selects between those candidate bit paths, the particular couplings to be provided in the memory instance being generated may be programmably defined when the memory compilation takes place, thus enabling a memory compiler to provide different instances of what is essentially the same memory, but wherein the couplings within the scrambling circuitry vary from memory instance to memory instance, thus further enhancing the security of memory instances generated according to the present techniques. Accordingly, in some embodiments executing the memory compiler computer program further comprises reading a programmable scrambling circuitry definition, wherein the programmable scrambling circuitry definition defines the coupling from the bit of the address to the at least two candidate bit paths.

This programmable scrambling circuitry definition can be provided by the user who causes the memory compilation to take place where the user wishes to have the freedom to do so, but in some embodiments the method comprises an initialization step of generating the programmable scrambling circuitry definition according to a set of scrambling rules. Thus, the user may choose not to provide this programmable scrambling circuitry definition, but allow the memory compiler to generate a valid programmable scrambling circuitry definition according to predetermined rules, which are provided within the memory compiler to ensure that a valid configuration of the scrambling circuitry results. This initialisation step may also have an element of randomisation itself, such that for each instance of the memory compiled by running this memory compilation method a different scrambling circuitry definition is generated for each.

At least some embodiments provide a memory compiler apparatus, comprising: memory architecture storage to store a memory architecture specifying a definition of circuit elements and data defining rules for combining those circuit elements; and memory instance generation circuitry to generate an instance of a memory device from the memory architecture, wherein the instance generated specifies a memory device according to any of the above described embodiments.

At least some embodiments provide a memory compiler apparatus, comprising: means for executing a memory compiler computer program to control a computer to generate an instance of a memory device from a memory architecture associated with the memory compiler computer program, wherein the memory architecture specifies a definition of circuit elements and data defining rules for combining those circuit elements, and wherein the instance generated specifies a memory device according to any of the above described embodiments.

At least some embodiments provide a computer program storage storing in a non-transient fashion a memory compiler computer program for controlling a computer to generate an instance of a memory device from a memory architecture associated with the memory compiler computer program, the memory architecture specifying a definition of circuit elements and data defining rules for combining those circuit elements, wherein the instance generated specifies a memory device according to any of the above described embodiments.

FIG. 1 schematically illustrates a data processing system 10 in one embodiment. The data processing system 10 comprises a data processing apparatus embodied as a system-on-chip (SOC) 12 device and an external memory. The SOC 12 comprises a processor core 16 and an on-chip memory 18. At system initialization the start-up procedure of the core 16 causes data to be retrieved from the external memory 14 and loaded into the on-chip memory 18. When accessing the content of the on-chip memory 18, the core 16 transmits an address A<0:n> of the data value to which access is required, and when the access is a write access a corresponding new data value DATA<0:d> to be written. As a result of the access (such as in the case of a read) a data value DATA<0:d> may be returned to the core. Additionally the core in this embodiment comprises scrambling value generation circuitry 20 which generates a scrambling value S<0:m> which it transmits to the on-chip memory (for example on a dedicated scrambling bus), where it is initially received at input 22 on the periphery of the memory, and from there imported into the memory to configure its operation as will be described in more detail with reference to the further figures. The scrambling value generation circuitry 20 is configured to change the scrambling value under various circumstances. In this embodiment the core 16 changes the scrambling value each time the system initializes, which has the effect that the physical locations to which the data retrieved from the external memory 14 is stored into the on-chip memory 18 changes each time this system initialization is carried out. The task of an external, possibly malicious, observer seeking to deduce information about the usage of the on-chip memory is thus made more difficult.

Figure 2:
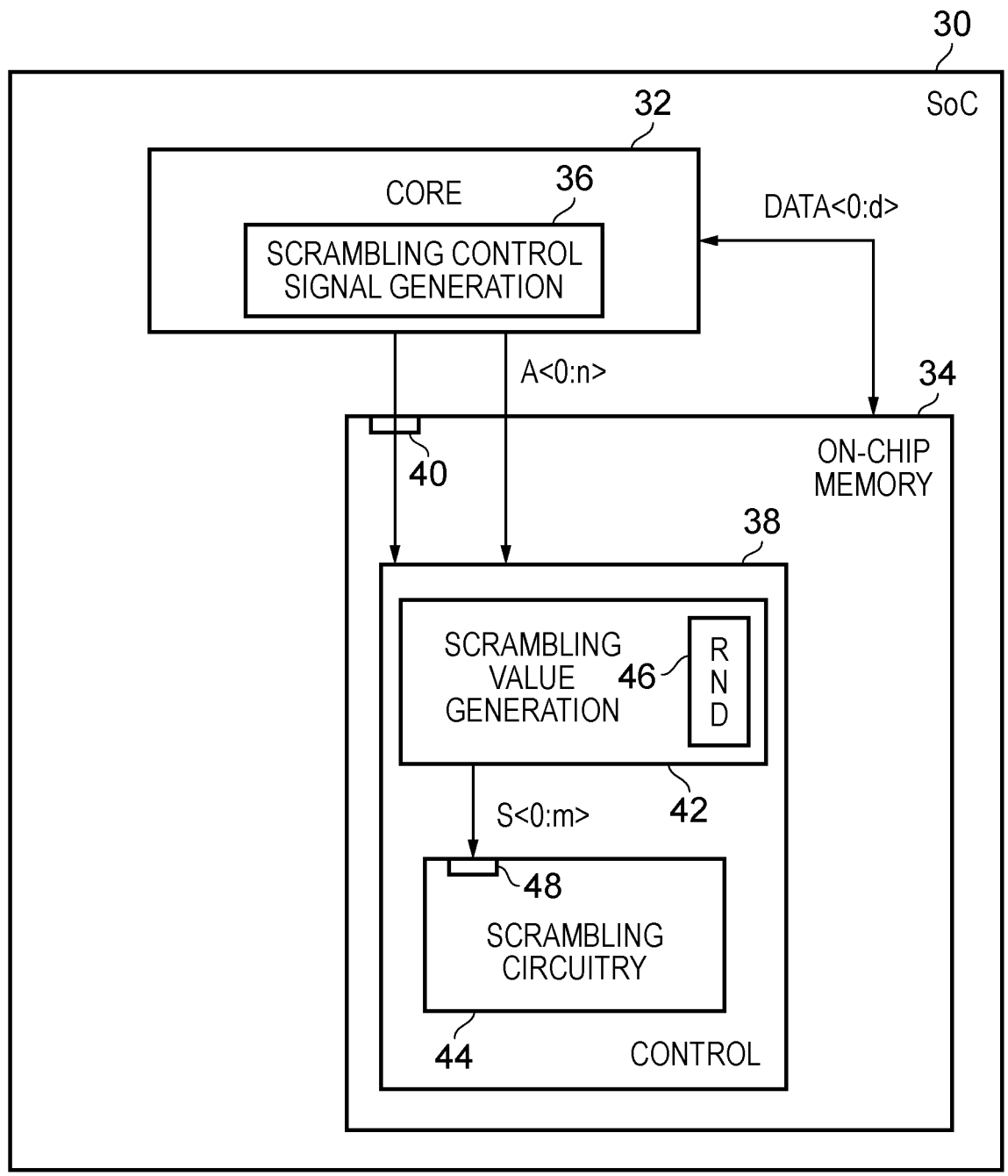
FIG. 2 schematically illustrates a variant on the data processing system shown in FIG. 1.

FIG. 2 schematically illustrates a variant 30 of the SOC 12 shown in FIG. 1. Only the components which differ from those of FIG. 1 are explicitly illustrated in FIG. 2. Here the SOC 30 again comprises a core 32 and an on-chip memory 34. In this embodiment the key difference to the embodiments shown in FIG. 1 is that the scrambling value generation takes place in the memory 34 rather than in the core. Nevertheless the control over when the scrambling value is changed is still maintained by the core 32 and for this purpose it is provided with scrambling control signal generation circuitry 36. This scrambling control signal generation circuitry generates a scrambling control signal, which is transmitted to the memory 34, and received therein by the control circuitry 38. The scrambling control signal enters the memory 34 via an input 40 dedicated to that purpose. The control circuitry 38 comprises scrambling value generation circuitry 42, which generates the scrambling value in a similar manner to the scrambling value generation circuitry 20 of FIG. 1, except that it does this in dependence on the scrambling value control signal received. The scrambling value control signal may configure various aspects of the scrambling value generated, or may simply indicate to the scrambling value generation circuitry when the scrambling value control signal should be changed. For the purpose of generating the scrambling value the scrambling value generation circuitry in this embodiment comprises randomization circuitry 46, which provides a random value on the basis of which the scrambling value generation circuitry can generate the scrambling value. This can be based on any suitable technique (e.g. using a random atomic or subatomic physical phenomenon) or any other random source familiar to the skilled person. The generated scrambling value is passed to the scrambling circuitry 44, where it is received at the scrambling input 48 and is then made use of in the scrambling circuitry as will be described in more detail below. Note that the on-chip memory 18 in FIG. 1 also comprises scrambling circuitry, but explicit illustration of this component has been omitted from FIG. 1 merely for clarity of illustration purposes.

Figure 3A:
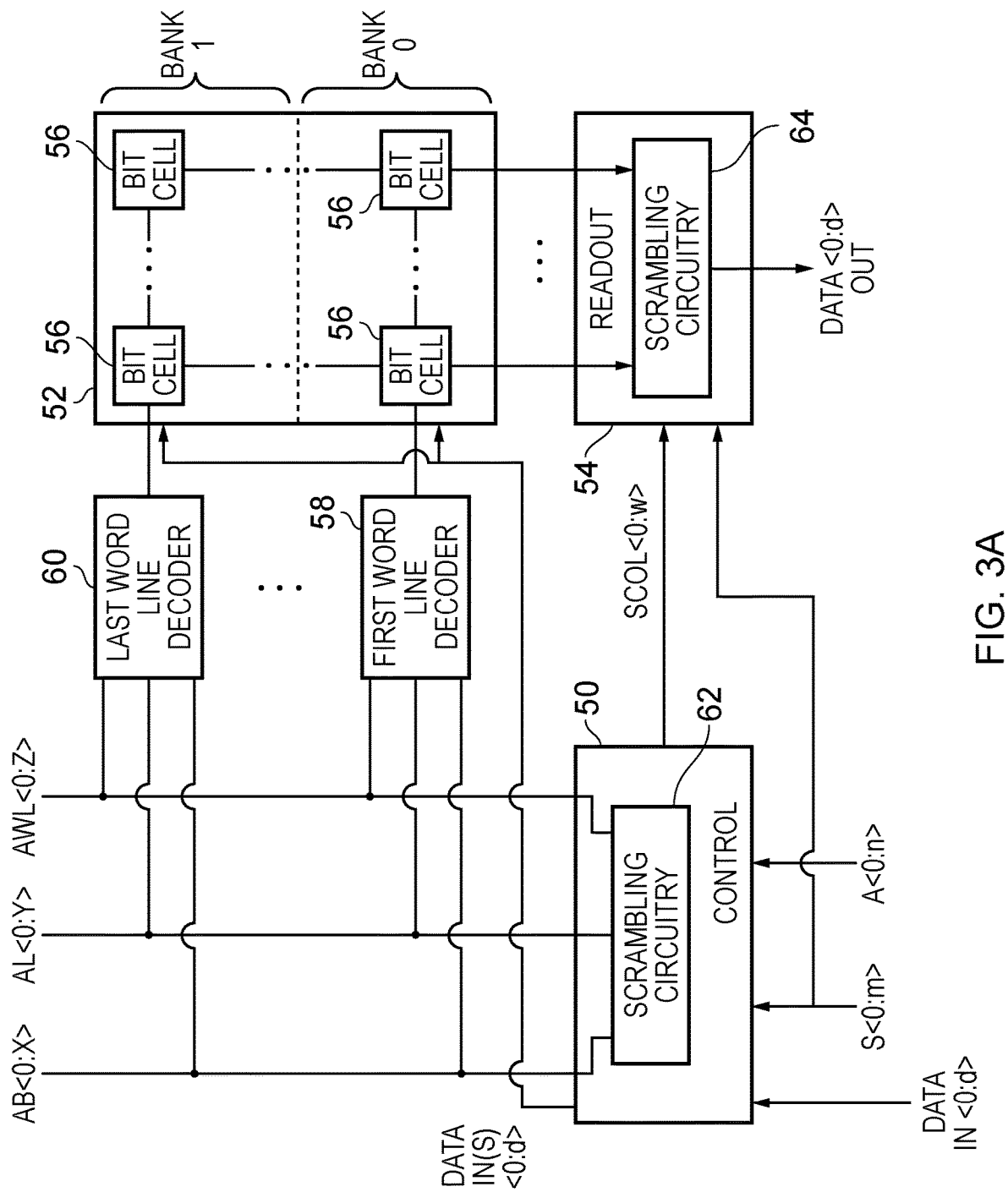
FIGS. 3A-D schematically illustrate in more detail the configuration of circuitry within a memory in example embodiments.

FIGS. 3A-D schematically illustrates in more detail some aspects of the configuration of the on-chip memories 18 and 34 in example embodiments thereof. Referring first to FIG. 3A, the main components shown are the control circuitry 50, the bit cell array 52 forming a plurality of storage locations for data values in the memory, and the read out circuitry 54. The control circuitry 50 receives the scrambling value S<0:m> (schematically illustrated as coming from external to the control circuit 50 in FIGS. 3A-D, but it will be understood that in the context of the memory 34 of FIG. 2 the source of this scrambling value S<0:m> may in fact be within the control circuitry 38) and the address value A<0:n>. In the event of a write, the control circuitry also receives the data to be written DATA IN<0:d>. On these basis of these values the control circuitry 50 generates a number of control signals which select a particular word-line and a particular bit-line within the bit-cell array 52. It will be appreciated that in the example of a read access to the bit-cell array, the DATA IN<0:d> is superfluous, but the skilled person will be familiar with the manner in which such a bit cell array 52 may also be accessed for the purposes of a write access thereto using provided data to be written. In a write access, the data received (DATA IN<0:d>) may also be scrambled by the scrambling circuitry using the scrambling value S<0:m>. Indeed when the data to be written is scrambled in this manner, the scrambling of the address can be dispensed with, since obfuscation of the content of the memory can be achieved only by scrambling the data.

The bit cell array 52 comprises a number of bit cells 56 of which only a very small subset are explicitly shown in FIGS. 3A-D for clarity. These bit cells 56 are arranged into a number of banks (and only two—bank 0 and bank 1—are shown in FIGS. 3A-D for clarity of illustration). Selection between the banks is made by the bank selection control signal AB<0:x> which is generated by the control circuitry 50. Within a bank a particular line and word line are selected by the line control signal AL<0:y> and the word line control signal AWL<0:z>. The control signals AB<0:x>, AL<0:y>, and AWL<0:z> are received by the word line decoders 58 and 60 (only two word line decoders are explicitly shown merely for clarity of illustration), and thus a selected word line is activated on the basis of those control signals. A column control signal SCOL<0:w> is also generated by the control circuitry 50 and transmitted to the read out circuitry 54. In the example embodiment shown in FIG. 3A both the control circuitry 50 and the read out circuitry 54 comprise scrambling circuitry 62 and 64 respectively. These two instances of scrambling circuitry have essentially the same configuration, except that the scrambling circuitry 62 scrambles using a received memory address A<0:n>, whilst the scrambling circuitry 64 scrambles the set of bits read out from the bit array 52 to generate the output data value DATA<0:d>. Note that the same scrambling value S<0:m> is received by the control circuitry 50 and the read out circuitry 54, although this is not necessary and a different scrambling value could be generated for each, or a different set of bits from the same scrambling value could be used for each.

Figure 3B:
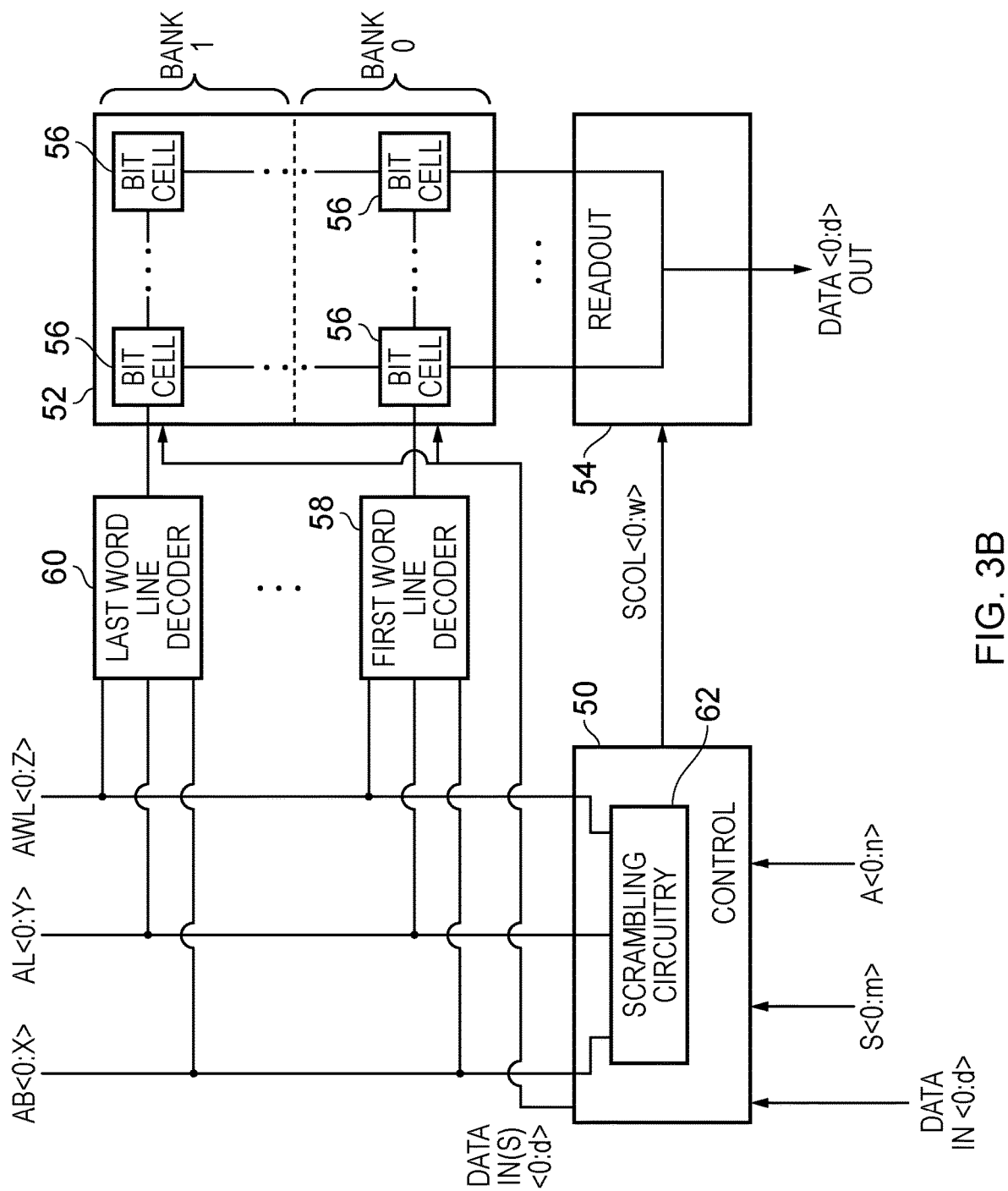

FIG. 3B shows an example configuration as a variant on the example of FIG. 3A, in which the scrambling circuitry is only present within the control circuitry 50 and not within the readout circuitry 54. In other words in this example the scrambling is only applied with respect to the address and not to the data being read out.

Figure 3C:
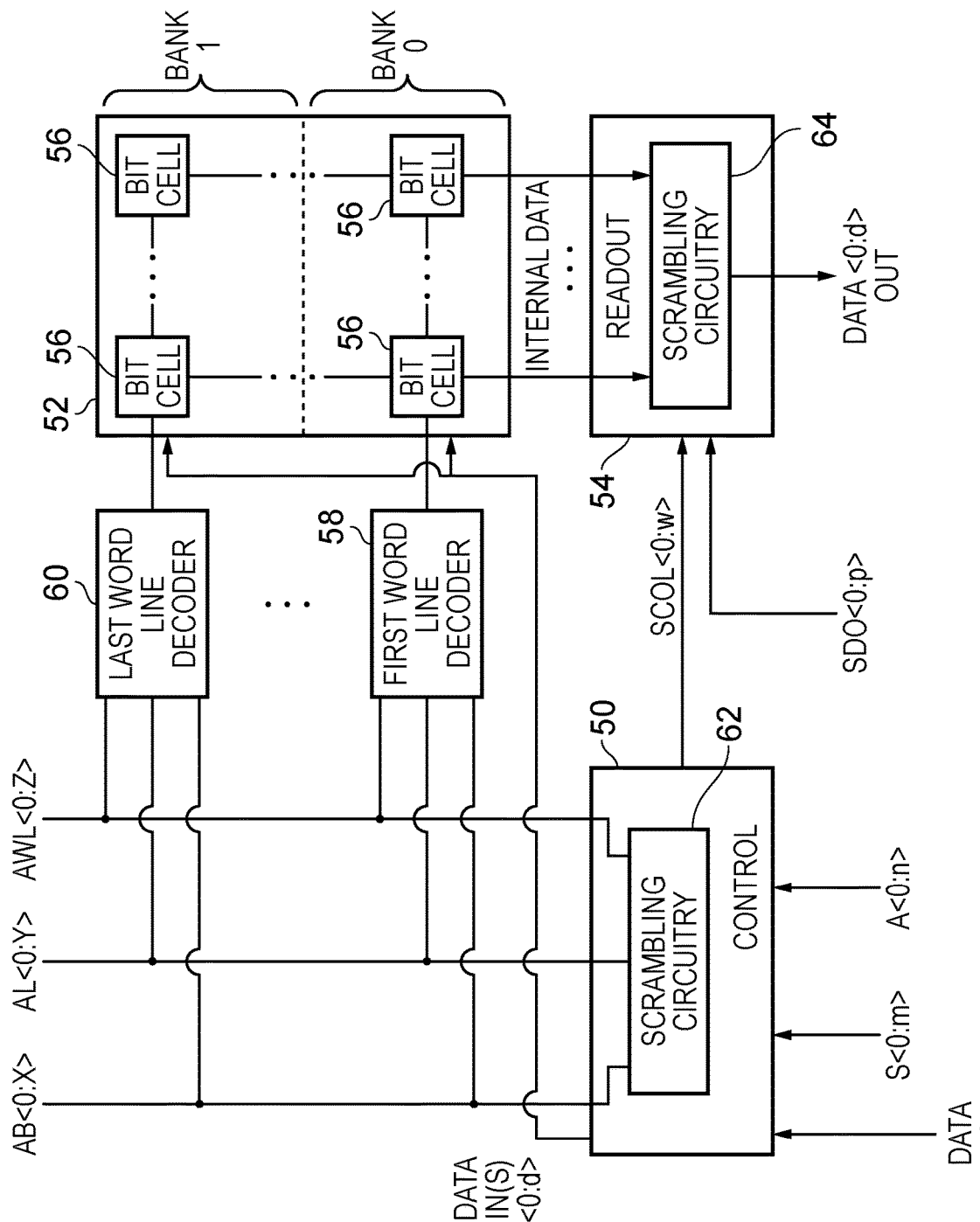

The further variant of FIG. 3C shows an example configuration as another variant on the example of FIG. 3A, in which the scrambling circuitry is present both within the control circuitry 50 and within the readout circuitry 54, but separate scrambling values (S<0:m> and SDO<0:m> respectively) are received to control the scrambling performed by each set of scrambling circuitry. In other words in this example the scrambling can not only be applied with respect to one or both the address and the data being read out, but further the scrambling in each case can be individually controlled by independent scrambling values.

Figure 3D:
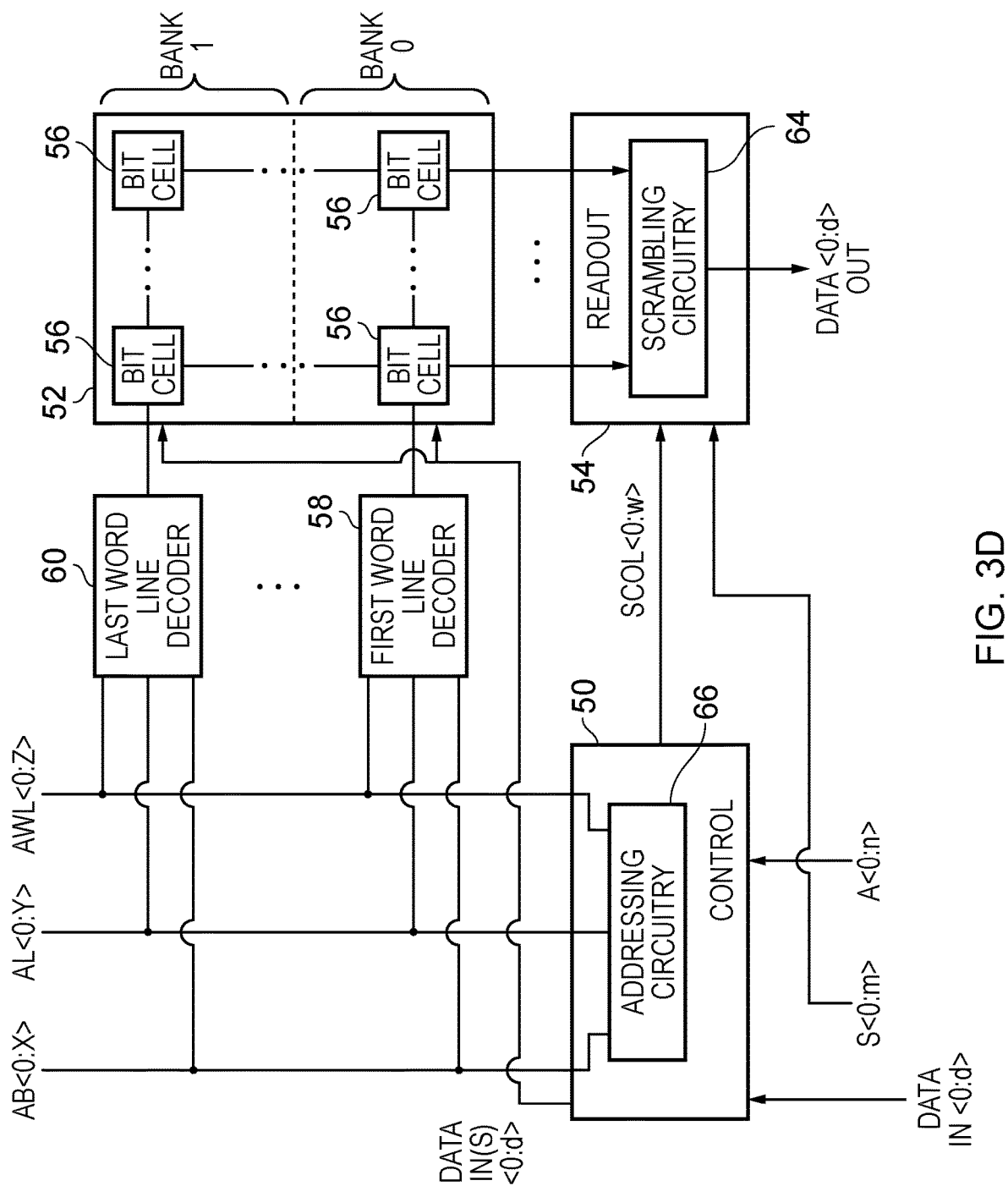

The variant of FIG. 3D shows an example configuration as a further variant on the example of FIG. 3A, in which the scrambling circuitry is only present within the readout circuitry 54, and not within the control circuitry 50. In other words in this example the scrambling can only be applied with respect to the data being read out, and not to the address. Consequently in the control circuitry 50 in FIG. 3D the scrambling circuitry 62 of FIG. 3A has been replaced by the addressing circuitry 66. It will be appreciated that this does not mean that the control circuitry 50 in FIG. 3D has some additional capability regarding addressing over the examples of FIGS. 3A-C, but rather merely that in the example of FIG. 3D only "direct" addressing occurs, without any scrambling.

FIGS. 4A, 4B and 4C schematically illustrate the configuration of scrambling circuitry in one embodiment. The labelling of these figures corresponds to scrambling circuitry configured to generate a scrambled address AS on the basis of a received address A, such as may be provided within the scrambling circuitry 62 shown in FIG. 3, but a very similar configuration may also be provided within the scrambling circuitry 64 of FIG. 3, where the labels A and AS would then represent the output of the bit cells and the data output DATA<0:d> respectively. Note that only a limited number of pass gates (PG) are shown in the embodiment shown, but the present techniques are in no way limited to such a number and any number of pass gates can be provided as appropriate to the scrambling value used, the address or data to be scrambled and so on. Similarly only a 4-bit scrambled address AS and a 4-bit received address A are shown for clarity, but the present techniques are in no way limited to such address sizes and any number of bits (perhaps not all) of the received address A (which itself can have any number of bits) can be scrambled.

FIG. 4A shows a pass gate PG 70 comprising a NAND gate 72, an inverter 74 and a pair of coupled transistors 76, which are arranged such that an address input bit A may be passed as a scrambled address bit AS in dependence on the values of the scrambling value bits S0 and S1. It can be seen that the example pass gate 70 in FIG. 4A will pass the bit A to provide the bit AS only when S0 and S1 are both high ("1"). Otherwise the pass gate blocks bit A. This pass gate cell 70 is made use of in the first (left-most) pass gate 70 in the set of pass gates 70, 72, 74 and 76 shown in FIG. 4B and forming selection circuitry to provide the bit AS from one of the input bits A0-A3. Note that the scrambling value bits S0 and S1 are inverted to form the bits S0*b* and S1*b* respectively and the permutations of S0, S0*b*, S1 and S1*b* used as inputs for the four pass gates 70-76 provide that each of A0-A3 can be provided as AS, in dependence on S0 and S1. The pass gates 70-76 thus form a 4-to-1 multiplexer.

FIG. 4C schematically illustrates how four 4-to-1 multiplexers 80, 82, 84, and 86 (each for example configured according to the 4-to-1 multiplexer configuration of FIG. 4B) may be used in the scrambling circuitry. In addition to the four multiplexers, a matrix of connections between the input lines carrying the four address bits A<0> to A<3> and four-fold input lines to each of the four 4-to-1 multiplexers is provided. Note that not all input lines are coupled to all multiplexers (e.g. multiplexer 84 has no input from A<3>) and a given input line may be coupled to more than one input of a given multiplexer (e.g. input A<3> is coupled to inputs 0 and 1 of multiplexer 80). In fact any permutation of couplings between the input lines carrying the address bits and the "candidate bit paths" forming the input of each multiplexer is possible in dependence on the particular requirements of how a received address should be translatable into a scrambled address.

FIGS. 5A, 5B and 5C show in tabular form how the scrambled address bits AS<0> to AS<3> are generated from the input address bits A<0> to A<3> in three different embodiments. In fact the table of FIG. 5A corresponds to the configuration shown in FIGS. 4A-4C, in particular corresponding to the arrangement of couplings shown in FIG. 4C. FIG. 5B shows a variation on the table of FIG. 5A in which it can be seen that the translation between input address bits and scrambled address bits is the same as that of the table of FIG. 5A for scrambling values of 00, 01 and 10, but differs for the translation carried out for a scrambling value of 11. In particular, notice that the translation performed for the scrambling value of 11 corresponds to a non-one-to-one mapping between the bits of A<0-3> and AS<0-3> wherein this particular example it can be seen from FIG. 5B that the scrambled address bits AS<3> and AS<2> are provided by the input bit A<0> and the scrambled address bits AS<0> and AS<1> are provided by the input bit A<1>. The use of one input address bit to provide two output address bits in this fashion results in a scrambled output address which is invalid for the memory to which it is being applied, and hence the selection of the scrambling value of 11, when using the mappings shown in the table of FIG. 5B, provides a mechanism for ensuring that the output of the memory will be meaningless.

FIG. 5C shows an alternative to the table of FIG. 5B, in which only the table entries corresponding to scrambling values of 00 and 11 are shown for the purposes of the present discussion. Note that the table entry for a scrambling value of 00 in FIG. 5C is the same as that shown for a scrambling value of 00 in the table of FIG. 5B, other than the fact that FIG. 5C shows that an output scrambled address bit AS<4> is not provided when the scrambling value is 00. However, the table entry in FIG. 5C for a scrambling value of 11 shows that the scrambled address bit AS<4> is generated, using the value of the input address bit A<3>, whilst the output scrambled address bit AS<3> is not generated, when the scrambling value is 11. Moreover, it can be seen from the table of FIG. 5C that a scrambling value of 00 simply provides each scrambled address bit (other than AS<4>) using the corresponding input address bit, but when the scrambling value is 11, the input address bit A<3> is used instead to provide the scrambled address bit AS<4>, whilst no value is provided as the scrambled address bit AS<3>. This technique may be used in the context of the memory in which the address bit AS<4> has no meaning, for example referring to a non-existent storage location in the memory, and hence by switching the scrambling value from 00 to 11, this represents another mechanism by which an invalid address (according to the addressing protocol of the particular memory being used) can be generated, and hence the output of the memory can be forced to be meaningless.

It should be noted with respect to the examples given in FIGS. 5B and 5C that, in order to allow the memory to comply with certain addressing constraints, the implementation of these examples may make use of redundant addressing bits. In other words the memory being addressed is in fact physically smaller than the number of bit-cell addresses which are available. For example, in the context of FIG. 5B, the addressing defined may be such that one of AS<1> and AS<0> is not actually used (i.e. does not correspond to any internal selection). As another example, in the context of FIG. 5C, when S=<0,0> AS<4> may not used (in the sense that it does not correspond to any physical bit-cell). Similarly, when S=<1,1>, AS<3> may not used (not corresponding to any physical bit-cell).

Figure 6:
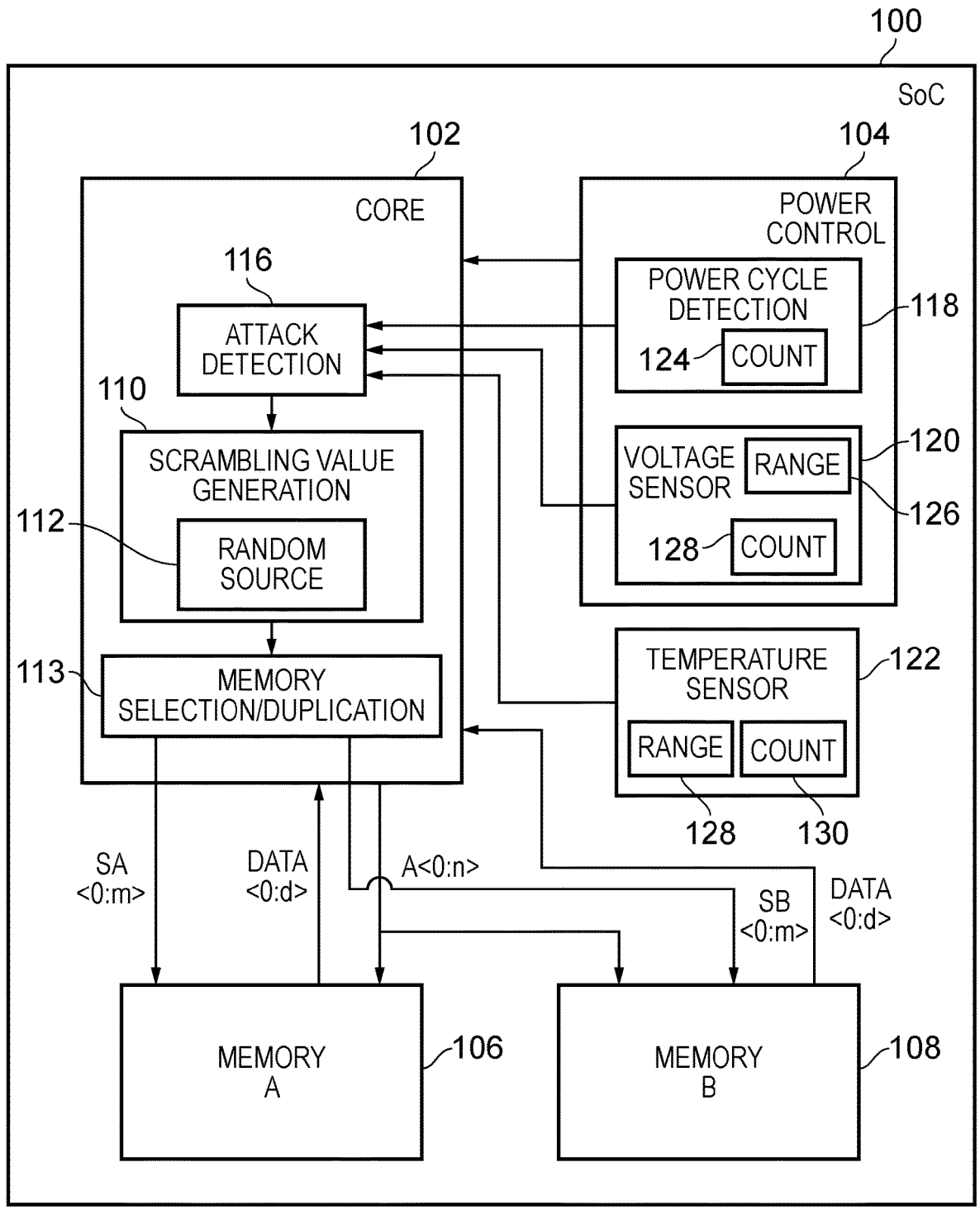
FIG. 6 schematically illustrates a data processing apparatus having two memories in one embodiment.

FIG. 6 schematically illustrates a system-on-chip 100. The main components are the processor core 102, the power control circuitry 104, a first memory (A) 106 and a second memory (B) 108. Similarly to the SOC 10 of FIG. 1 and the core 102 comprises scrambling value generation circuitry 110 for generating a scrambling value to be used by the scrambling circuitry of the memories 106 and 108 in the manner described above. To this end, the scrambling value generation circuitry 110 further comprises a random source 112, which in this example embodiment derives a random numerical value based on a selected random atomic or subatomic physical phenomenon, to enable the scrambling value generation circuitry 110 to create randomly selected scrambling values (from amongst a range of possible scrambling values). The core 102 further comprises memory selection/duplication circuitry 113 which essentially serves two purposes. The first purpose of this circuitry is to enable the core 102 to select between memories 106 and 108 when the SOC 100 is configured to use the memories 106 and 108 as independent storage locations. Accordingly, the SOC 100 can use each memory for a different purpose, for example storing instructions in memory 106 and associated data in memory 108. The choice of which particular memory to use for which storage purpose may form part of the translation between an address used within the processor core 102 and the storage location in the memories 106 and 108. For example, one bit of the scrambling value generated by the scrambling value generation circuitry 110 can be used to select between memory 106 and memory 108. However, the memory selection/duplication circuitry 113 also serves another purpose, namely to support a duplication technique to support the reliability of data stored in memories 106 and 108, wherein identical data is stored within both memories, and when a particular memory address is accessed, the corresponding stored data values from that address in each memory are compared in order to verify that there is no difference between them, lending confidence to the user that the corresponding storage locations in each memory have not been interfered with. Although identical data can be stored in each of memories 106 and 108 when they are being used in this manner, the core 102 can nevertheless cause the mapping between an address which it uses and the physical storage locations accessed in each of the memories 106 and 108 to differ, by virtue of a different scrambling value being used for each memory. In FIG. 6 this is shown by the scrambling value SA<0:m> from memory 106 and the scrambling value SB<0:m> used for memory 108. Thus, although the same data is stored within the two memories, this will be difficult for an external observer to determine or verify, by virtue of the fact not only that the data are stored at different physical locations within each memory, but further that the present techniques enable these physical locations in both memories to be changed (independently of one another) by changing each of the scrambling values SA and SB. FIG. 6A also shows the address A<0:m> being passed from the core 102 to each of the memories 106 and 108 and the corresponding data DATA<0:d> being returned to the core 102 from each of the memories 106 and 108.

Processor core 102 further comprise attack detection circuitry 116 which is configured to receive signals from a range of sources, which may indicate that an external observer is seeking to derive information about the operation of the SOC 100 and/or the data which it is processing, which the provider of that SOC 100 does not wish the external observer to be able to do. The SOC 100 has three components here which can provide the attack detection circuitry 116 with information which may indicate that the above-mentioned unwanted attack (a.k.a. "hack") is taking place. These are the power cycle detection circuitry 118, the voltage sensor 120 and the temperature sensor 122. The power cycle detection circuitry 118 and the voltage sensor circuitry 120 form part of the power control circuitry 104. The temperature sensor 122 is an independent component of the SOC 100. The power cycle detection circuitry 118 is arranged to monitor the frequency with which the SOC 100 is taken through a power cycle, i.e. is booted up and down. For this purpose the power cycle detection circuitry is further provided with persistent count storage 124, with which it can keep track of the number of times that the SOC 100 has been power cycled. Either this information itself can be provided to the attack detection circuitry 116, or the power cycle detection circuitry 118 can be arranged to compare the frequency of power cycling with a pre-determined value and if this predetermined value is exceeded to signal a potential attack based on power cycling to the attack detection circuitry 116. Similarly, the power control circuitry 104 is provided with the voltage sensor circuitry 120, which is arranged to monitor the voltage at which the SOC 100 is being operated, and in particular to determine if the SOC 100 is being operated outside of a predetermined voltage range, which may be indicative that an external observer is operating the SOC 100 at an unusually high or low voltage in order to seek to make it more vulnerable to external investigation.

The voltage sensor circuitry 120 is provided with range storage 126 and count storage 128 so that it can compare the current operational voltage with a predetermined acceptable range (held by the range storage 126). It can also maintain a persistent count, using count storage 128, of how frequently the operational voltage of the SOC 100 has been, for example, repeatedly brought into and out of the predefined range or for example has been taken between a high value above that range and a low value below that range, any of which may be indicative of a hacking attack. The voltage sensor circuitry 120 signals such information to the attack detection circuitry 116.

The temperature sensor circuitry 122 is arranged to monitor the ambient temperature, since an unusually high or low temperature may be indicative that an external observer is seeking to make SOC 100 more vulnerable to external investigation. The temperature sensor circuitry 122 is provided with range storage 128 and count storage 130, so that it can compare the current temperature with a predetermined acceptable range (held by the range storage 128). It can also maintain a persistent count, using count storage 128, of how frequently the operational voltage of the SOC 100 has been, for example, repeatedly brought into and out of the predefined range, or for example has been taken between a high value above that range and a low value below that range, any of which may be indicative of a hacking attack. The temperature sensor circuitry 122 signals such information to the attack detection circuitry 116.

As well as receiving information from these sources, the attack detection circuitry 116 can also determine an attack indication from a software source—for example embodied as a software value set by a software routine running either within the attack detection circuitry 116 or more generally within the core 102, which monitors certain conditions (values) within the apparatus and determines that an attack may be in progress based on a certain combination of those conditions (values). Whatever the source of the information, when the attack detection circuitry 116 determines that a possible hacking attack is taking place, it signals to the scrambling value generation circuitry 110 that the scrambling value should be changed, which is then done, as described above.

Figure 7:
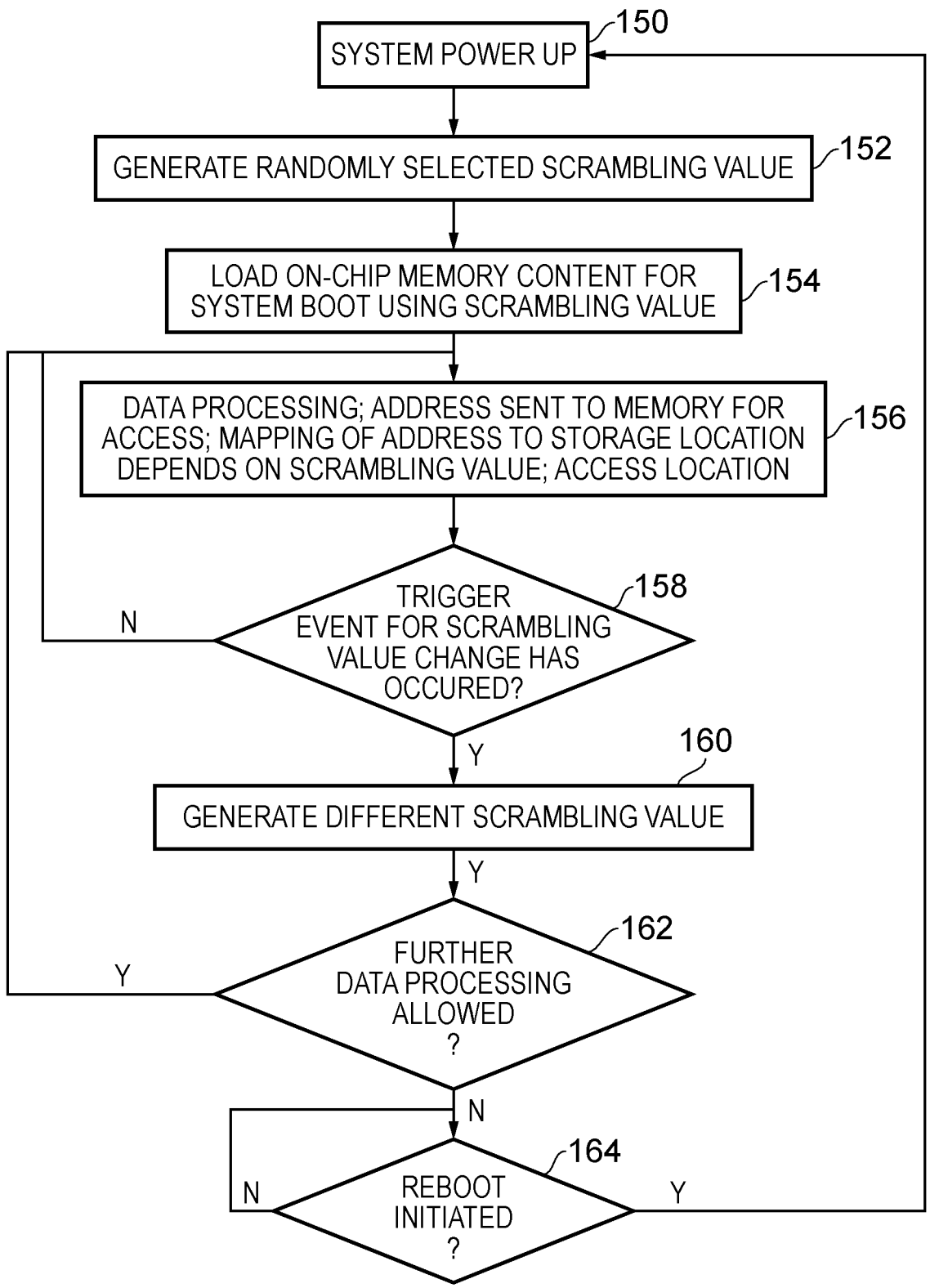
FIG. 7 shows a sequence of steps which are taken according to the method of one embodiment.

FIG. 7 illustrates a sequence of steps which are taken in the method of one embodiment when operating a system-on-chip. The flow illustrated in FIG. 7 can be considered to begin at step 150 where the system powers up. Thereafter at step 152 a randomly selected scrambling value is generated which is used at step 154, when data is loaded onto the chip from an external memory source as part of the system boot-up. In particular, in the manner described above, this scrambling value is used to define the mapping between address values of those data values and the physical storage location of those data values using that address within one or more memories on-chip. Thus configured, at step 156 the system-on-chip then proceeds with its data processing, which comprises a processor core on-chip sending an address to an on-chip memory for access and within the memory that address being mapped to a storage location within the memory dependent on the current scrambling value being used. The particular storage location is accessed and data is either read therefrom or written thereto as appropriate. Step 158 illustrates that the system continually monitors if a trigger event for changing the scrambling value has occurred and whilst it has not the data processing of step 156 continues. When however, at step 158, it is determined that such a trigger event has occurred (for example with reference to the embodiment in FIG. 6 by means of the attack detection circuitry 116 receiving information from the power cycle detection circuitry 118, the voltage sensor circuitry 120, and/or the temperature sensor circuitry 112, indicating such a trigger event), the flow then proceeds to step 160 where a different scrambling value is generated. It is then determined at step 162 if further data processing is allowed. For example, if the change in the scrambling value is used by the processor core to quickly "corrupt" the content of the memory and no further data processing should take place until a reboot happens, then further data processing is not allowed and the flow proceeds to step 164. However, it may be the case that the processor core continues with data processing, even though the results of this data processing may not be of particular practical use in themselves following the change of scrambling value, it may nevertheless be useful in defence against a hacking attack in that by continuing the data processing, the hacker may remain unaware that the data processing system has triggered a change in the scrambling value due to the attack taking place and the continued data processing (by means of the flow proceeding back to step 156) can hide this defensive technique from the hacker. However, when the flow does proceed to step 164 (i.e. further data processing is not allowed), then the flow waits at step 164 until a reboot has been initiated before the flow can then return to step 150 for a new system power-up.

Figure 8:
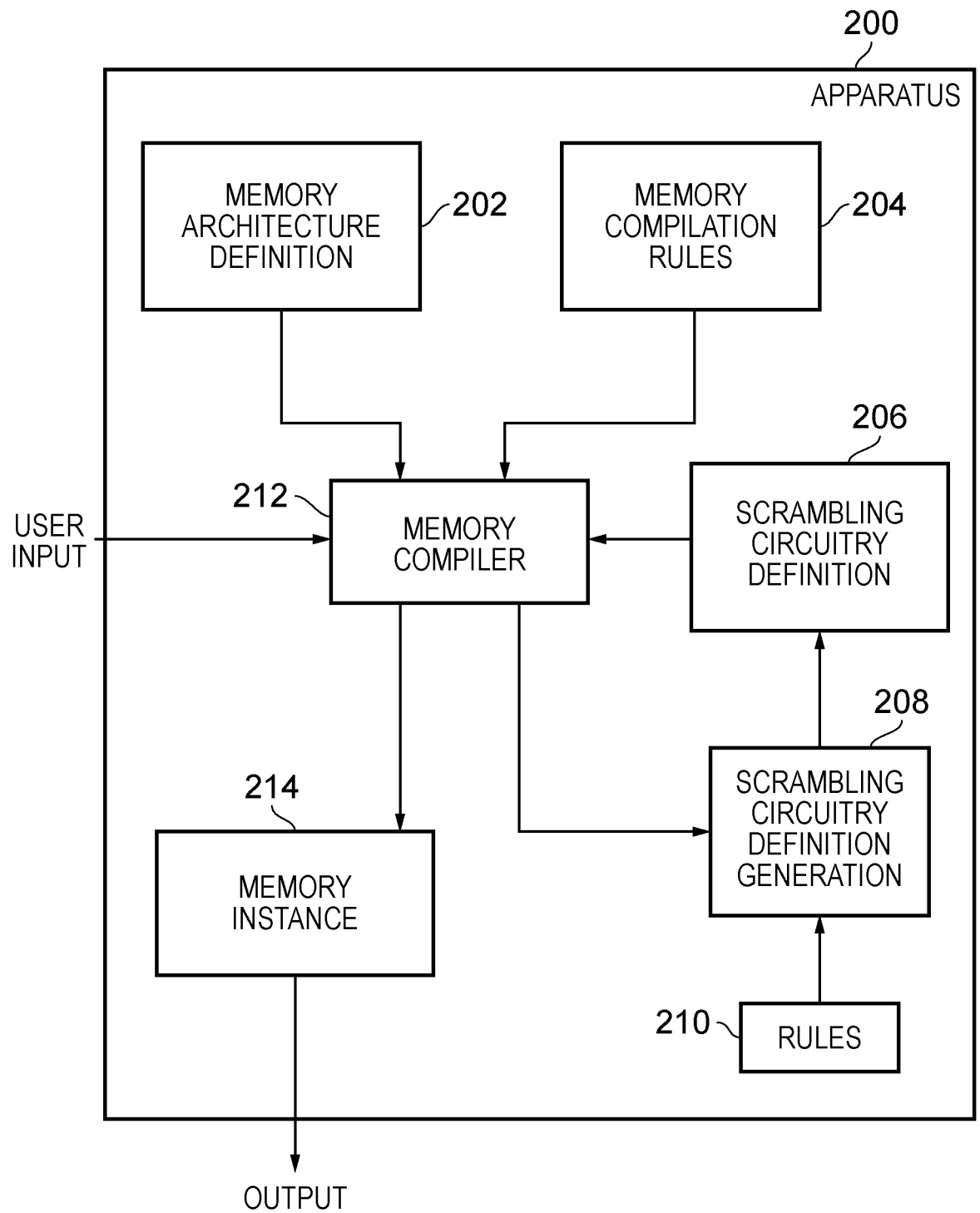
FIG. 8 schematically illustrates a memory compiler apparatus in one embodiment.

FIG. 8 schematically illustrates an apparatus of one embodiment which is used to compile a memory such as one of the memories described above. For example, the skilled person will be familiar with techniques by which a desktop computer may provide such a memory compiler apparatus, and the designer of a system-on-chip may use such a memory compiler to generate a particular instance of a memory which is used in that system-on-chip. For this purpose, the memory compiler apparatus 200 has access to a memory architecture definition 202 and a set of memory compilation rules 204, which configure the manner in which the memory compilation can take place and the form which the generated memory instance can take. According to the present techniques, the memory compiler apparatus 200 further has access to a scrambling circuitry definition 206, particularly relating to the configuration of the scrambling circuitry of the memory and for example the matrix of connections shown in FIG. 4C, or as alternatively represented by the tables of FIGS. 5A-C. This scrambling circuitry definition 206 may be predetermined, or may be generated within the memory compiler apparatus 200 by a component thereof, namely the scrambling circuitry definition generation unit 208, which is configured to do so according to a set of predetermined rules 210. These rules in particular ensure that the scrambling circuitry definition thus generated adheres to constraints which are appropriate for the memory instance being generated, such that it may be suitably addressed and so on. The central component of the apparatus 200 is the memory compiler unit 212 which brings together the memory architecture definition 202, the memory compilation rules 204, and the scrambling circuitry definition 206 in order to generate a memory instance 214, which may be temporarily stored within the apparatus 200, before being output. The user of the apparatus 200 can interact with the memory compiler unit 212 in order to configure particular aspects of its operation, for example defining particular parameters of the memory instance required (e.g. the number of banks, the dimensions of the bit array in each bank, and so on). The user may also choose to provide a scrambling circuitry definition for the memory compiler to use, or may instruct the memory compiler 212 to cause the scrambling circuitry definition generation unit 208 to generate a scrambling circuitry definition as required.

Figure 9:
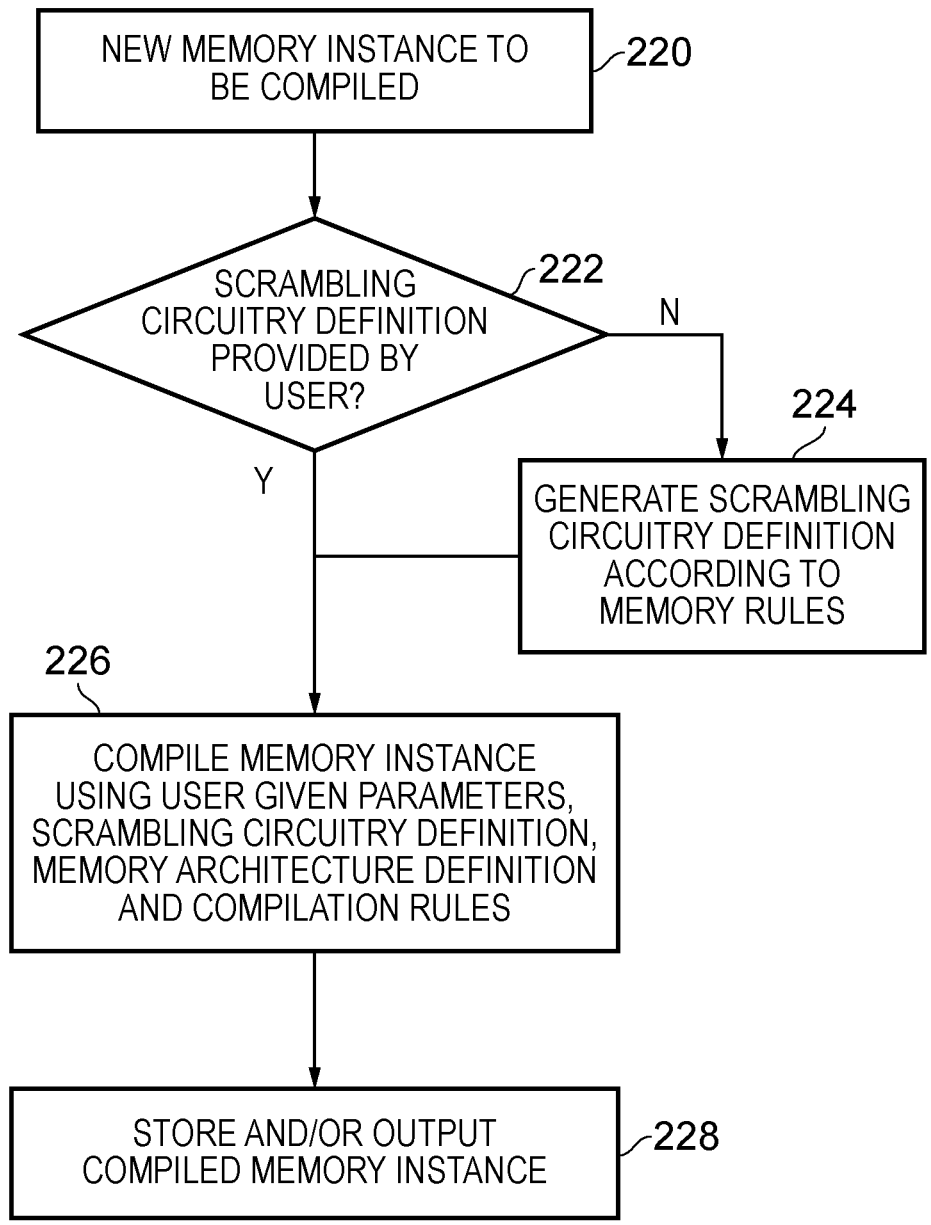
FIG. 9 shows a sequence of steps which are taken when performing memory compilation in one embodiment.

FIG. 9 shows a sequence of steps which outline the method by which a memory compiler apparatus such as that illustrated in FIG. 8 may operate in one embodiment. The flow begins at step 220 where a new memory instance is to be compiled. At step 222 it is determined if a scrambling circuitry definition has been provided by the user, and if it has not then the flow proceeds via step 224 where a scrambling circuitry definition according to predetermined rules for the memory instance being compiled is generated. Then, at step 226 a memory instance is generated using various user given parameters, the scrambling circuitry definition (either provided by the user or as generated by the scrambling circuitry definition generation unit), and using a definition of the memory architecture and compilation rules. Then at step 228 the thus-compiled memory instance may temporarily be stored, and/or output as a compiled memory instance.

Figure 10:
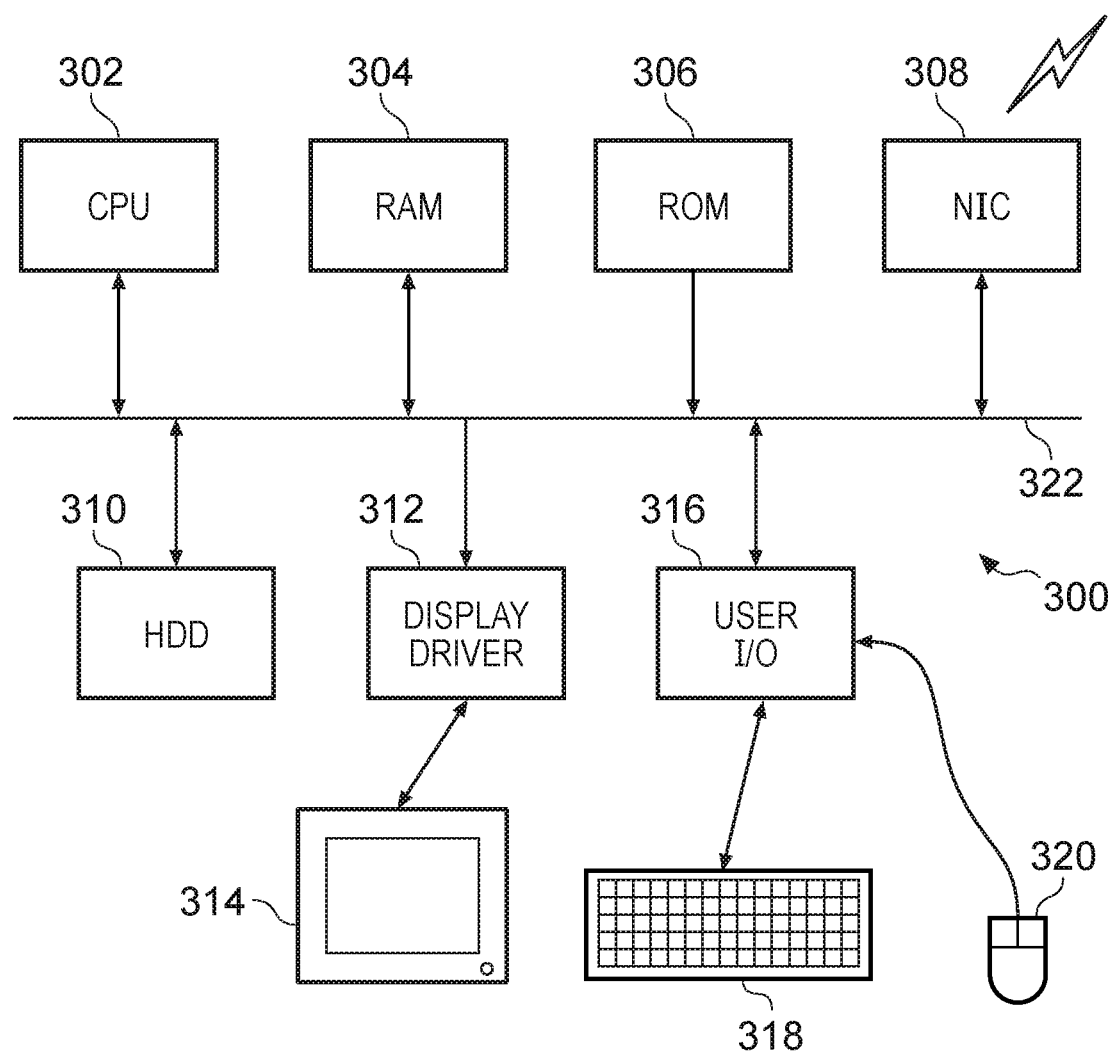
FIG. 10 schematically illustrates a computing device suitable for supporting various aspects of the present techniques.

FIG. 10 schematically illustrates a general purpose computing device 300 of the type that may be used to implement the above described memory compilation techniques. As mentioned above, in the context of the present invention this could for example be a desktop computer configured to act as a memory compiler apparatus. The general purpose computing device 300 includes a central processing unit 302, a random access memory 304 and a read only memory 306, connected together via bus 322. It also further comprises a network interface card 308, a hard disk drive 310, a display driver 312 and monitor 314 and a user input/output circuit 316 with a keyboard 318 and mouse 320 all connected via the common bus 322. In operation, such as when performing memory compilation, the central processing unit 302 will execute computer program instructions that may for example be stored in the random access memory 304 and/or the read only memory 306. In such a situation program instructions could be additionally retrieved from the hard disk drive 310 or dynamically downloaded via the network interface card 308. The results of the processing performed may be displayed to a user or an engineer via a connected display driver 312 and monitor 314. User inputs for controlling the operation of the general purpose computing device 300 may be received via a connected user input output circuit 316 from the keyboard 318 or the mouse 320. It will be appreciated that the computer program could be written in a variety of different computer languages. The computer program may be stored locally on a recording medium or dynamically downloaded to the general purpose computing device 300. When operating under control of an appropriate computer program, the general purpose computing device 300 can perform the above described memory compilation techniques and can be considered to form a memory compiler apparatus. The architecture of the general purpose computing device 300 could vary considerably and FIG. 10 is only one example.

Some further example configurations are set out in the following numbered paragraphs.

1. A memory comprising:
   an address input to receive an address;
   data storage circuitry to store a plurality of data values at a plurality of storage locations;
   addressing circuitry to access a data value of the plurality of data values at a storage location of the plurality of storage locations in dependence on the address;
   a scrambling input to receive a scrambling value;
   readout circuitry to provide an output value from the memory in dependence on the data value read from the storage location; and
   scrambling circuitry to select at least one of:
   a mapping between the address and the storage location; and
   a mapping between the data value and the output value, in dependence on the scrambling value.

2. The memory of paragraph 1, wherein the scrambling circuitry is responsive to the scrambling value to generate a scrambled address in dependence on the mapping selected, wherein for at least one mapping at least two bits of the scrambled address are swapped with respect to at least two corresponding bits of the address.

3. The memory of paragraph 2, wherein the scrambling circuitry comprises:
   a coupling from a bit of the address to at least two candidate bit paths; and
   selection circuitry responsive to the scrambling value to select one of the candidate bit paths to provide a corresponding bit of the scrambled address.

4. The memory of paragraph 3, wherein the scrambling circuitry comprises:
   scrambled address selection circuitry for each bit of the scrambled address; and
   at least one coupling from each bit of the address to at least one scrambled address selection circuitry.

5. The memory of paragraph 1, wherein the addressing circuitry comprises address interpretation circuitry to generate memory-specific control signals to access the storage location in dependence on the address, wherein the memory-specific control signals comprise at least one of:
   a bank address;
   a line address;
   a word-line address; and
   a column address,
which is dependent on the mapping selected by the scrambling circuitry.

6. The memory of paragraph 1, wherein the scrambling input is internal to the memory to receive the scrambling value from scrambling value generation circuitry comprised in the memory.

7. The memory of paragraph 6, wherein the scrambling value generation circuitry comprises randomization circuitry to generate a randomly selected scrambling value.

8. A data processing system comprising:
   a processor to perform data processing operations; and
   at least one memory at set out in paragraph 1.

9. The data processing system of paragraph 8, wherein the processor comprises scrambling value generation circuitry to generate the scrambling value.

10. The data processing system of paragraph 8, wherein the processor is responsive to the trigger event to maintain the changed scrambling value until the data processing system is rebooted.

11. The data processing system of paragraph 8, wherein the scrambling value generation circuitry comprises randomization circuitry to generate a randomly selected scrambling value.

12. A memory comprising:
    means for storing a plurality of data values at a plurality of storage locations;
    means for receiving an address;
    means for receiving a scrambling value;
    means for selecting at least one of:
    a mapping between the address and a storage location of the plurality of storage locations; and
    a mapping between a data value and an output value, in dependence on the scrambling value; and
    means for accessing the data value of the plurality of data values at a storage location of the plurality of storage locations in dependence on the address; and
    means for providing the output value at an output of the memory in dependence on the data value read from the storage location.

13. A method of operating a data processing system comprising at least one memory at set out in paragraph 1, the method comprising:
    transmitting an address to the address input; and
    one of the steps of:
    transmitting the scrambling value to the scrambling input; and
    transmitting the scrambling control signal to the scrambling control input.

14. A data processing system comprising:
    at least one memory at set out in paragraph 1;
    means for transmitting an address to the address input; and
    one of:
    means for transmitting the scrambling value to the scrambling input; and
    means for transmitting the scrambling control signal to the scrambling control input.

15. A method of memory compilation comprising:
    executing a memory compiler computer program to control a computer to generate an instance of a memory device from a memory architecture associated with the memory compiler computer program,
    wherein the memory architecture specifies a definition of circuit elements and data defining rules for combining those circuit elements,
    and wherein the instance generated specifies a memory device at set out in paragraph 1.

16. The method of memory compilation of paragraph 15, wherein the scrambling circuitry comprises: a coupling from a bit of the address to at least two candidate bit paths; and selection circuitry responsive to the scrambling value to select one of the candidate bit paths to provide a corresponding bit of the scrambled address, wherein executing the memory compiler computer program further comprises reading a programmable scrambling circuitry definition, wherein the programmable scrambling circuitry definition defines the coupling from the bit of the address to the at least two candidate bit paths.

17. The method of memory compilation of paragraph 16, further comprising an initialization step of generating the programmable scrambling circuitry definition according to a set of scrambling rules.

18. A memory compiler apparatus, comprising:
memory architecture storage to store a memory architecture specifying a definition of circuit elements and data defining rules for combining those circuit elements; and
memory instance generation circuitry to generate an instance of a memory device from the memory architecture, wherein the instance generated specifies a memory device at set out in paragraph 1.

19. A memory compiler apparatus, comprising:
means for executing a memory compiler computer program to control a computer to generate an instance of a memory device from a memory architecture associated with the memory compiler computer program,
wherein the memory architecture specifies a definition of circuit elements and data defining rules for combining those circuit elements,
and wherein the instance generated specifies a memory device at set out in paragraph 1.

20. A computer program storage medium storing in a non-transient fashion a memory compiler computer program for controlling a computer to generate an instance of a memory device from a memory architecture associated with the memory compiler computer program, the memory architecture specifying a definition of circuit elements and data defining rules for combining those circuit elements, wherein the instance generated specifies a memory device at set out in paragraph 1.

By way of brief overall summary a memory, a data processing system comprising a memory, a method of operating a memory and a memory compiler apparatus and method of memory compilation are provided, which relate to a memory comprising data storage circuitry to store data values at data locations. Addressing circuitry is provided to access the data value at a storage location in dependence on a received address and readout circuitry to provide an output value in dependence on the accessed data value. The memory further comprises scrambling circuitry to select at least one of: a mapping between the address and the storage location; and a mapping between the data value and the output value, in dependence on a received scrambling value. The mapping between the address and the storage location and/or the data value and the output value can thus be easily and rapidly changed.

In the present application, the words "configured to . . ." or "arranged to" are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" or "arranged to" does not imply that the apparatus element needs to be changed in any way in order to provide the defined operation.

Although illustrative embodiments have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

We claim:

1. A data processing system, comprising:
a memory having an address input to receive an address;
data storage circuitry to store a plurality of data values at a plurality of storage locations;
addressing circuitry to access a data value of the plurality of data values at a storage location of the plurality of storage locations in dependence on the address;
a scrambling input to receive a scrambling value;
readout circuitry to provide an output value from the memory in dependence on the data value read from the storage location;
attack sensing circuitry to provide an attack indication, wherein the attack sensing circuitry comprises at least one of power cycling detection circuitry, voltage range detection circuitry, and temperature range detection circuitry; and
scrambling circuitry to select at least one of a mapping between the address and the storage location, and to generate a scrambled address triggered by the attack indication; and
a mapping between the data value and the output value, in dependence on the scrambling value.

2. The data processing system as claimed in claim 1, wherein the scrambling circuitry is responsive to the scrambling value to generate a scrambled address in dependence on the mapping selected, wherein for at least one mapping at least two bits of the scrambled address are swapped with respect to at least two corresponding bits of the address.

3. The data processing system as claimed in claim 2, wherein the scrambling circuitry is responsive to a first value of the scrambling value to select a first mapping, wherein the first mapping provides a one-to-one mapping between bits of the address and bits of the scrambled address.

4. The data processing system as claimed in claim 2, wherein the scrambling circuitry is responsive to a second value of the scrambling value to select a second mapping, wherein the scrambled address generated according to the second mapping is invalid according to an addressing protocol of the memory.

5. The data processing system as claimed in claim 4, wherein the second mapping provides a non-one-to-one mapping between bits of the address and bits of the scrambled address.

6. The data processing system as claimed in claim 4, wherein the scrambled address is of a non-existent storage location in the memory.

7. The data processing system as claimed in claim 1, wherein the scrambling circuitry is responsive to the scrambling value to generate a scrambled set of data value for storage.

8. The data processing system as claimed in claim 1, wherein the readout circuitry comprises readout scrambling circuitry to select a readout mapping between the data value read from the storage location and the output value in dependence on the scrambling value.

9. The data processing system as claimed in claim 1, wherein the scrambling input is on a periphery of the memory to receive the scrambling value from a source external to the memory.

10. The data processing system as claimed in claim 1, wherein the scrambling input is internal to the memory to receive the scrambling value from scrambling value generation circuitry comprised in the memory.

11. The data processing system as claimed in claim 10, comprising a scrambling control input on a periphery of the memory to receive a scrambling control signal from a source external to the memory, wherein the scrambling circuitry is responsive to a change in the scrambling control signal to change the scrambling value.

12. A data processing system comprising:
a processor to perform data processing operations; and
a memory comprising:
- an address input to receive an address;
- data storage circuitry to store a plurality of data values at a plurality of storage locations;
- addressing circuitry to access a data value of the plurality of data values at a storage location of the plurality of storage locations in dependence on the address;
- a scrambling input to receive a scrambling value;
- readout circuitry to provide an output value from the memory in dependence on the data value read from the storage location; and
- scrambling circuitry to select at least one of a mapping between the address and the storage location, and to generate a scrambled address triggered by an attack indication, wherein the attack indication is determined by comparing a frequency of power cycling with a predetermined value; and
- a mapping between the data value and the output value, in dependence on the scrambling value.

13. The data processing system as claimed in claim 12, comprising:
a scrambling control input on a periphery of the memory to receive a scrambling control signal from a source external to the memory; and
scrambling value generation circuitry responsive to a change in the scrambling control signal to change the scrambling value, and wherein the processor comprises scrambling control signal generation circuitry to generate the scrambling control signal.

14. The data processing system as claimed in claim 12, wherein the scrambling circuitry is configured to corrupt at least some content of the memory responsive to the attack indication.

15. The data processing system as claimed in claim 14, wherein the attack indication comprises at least one of:
a power-up of the data processing system; and
a power-down of the data processing system.

16. The data processing system as claimed in claim 15, comprising attack sensing circuitry to provide the attack indication, wherein the attack sensing circuitry comprises at least one of:
power cycling detection circuitry;
voltage range detection circuitry; and
temperature range detection circuitry.

17. The data processing system as claimed in claim 14, wherein the memory is a read-only-memory and the scrambling circuitry is arranged to generate the scrambling value prior to the attack indication with a predetermined value.

18. The data processing system as claimed in claim 12, comprising a first memory and a second memory, and memory selection circuitry to select between the first memory and the second memory to select the storage location in dependence on the scrambling value.

19. The data processing system as claimed in claim 18, comprising;
duplication circuitry to duplicate content of the first memory in the second memory; and
scrambling value generation circuitry arranged to generate a first scrambling value for the first memory and a second scrambling value for the second memory, wherein the first scrambling value is not equal to the second scrambling value.

20. A method of operating a memory comprising:
storing a plurality of data values at a plurality of storage locations;
receiving an address;
receiving a scrambling value;
selecting at least one of
a mapping between the address and a storage location of the plurality of storage locations; and
a mapping between a data value and an output value, in dependence on the scrambling value;
accessing the data value of the plurality of data values at a storage location of the plurality of storage locations in dependence on the address;
providing the output value at an output of the memory in dependence on the data value read from the storage location;
determining an attack indication by comparing a frequency of power cycling with a predetermined value; and
triggering a scrambling operation responsive to the attack indication.

* * * * *